(12) United States Patent
Feast et al.

(10) Patent No.: US 10,276,188 B2
(45) Date of Patent: Apr. 30, 2019

(54) SYSTEMS AND METHODS FOR IDENTIFYING HUMAN EMOTIONS AND/OR MENTAL HEALTH STATES BASED ON ANALYSES OF AUDIO INPUTS AND/OR BEHAVIORAL DATA COLLECTED FROM COMPUTING DEVICES

(71) Applicant: Cogito Corporation, Boston, MA (US)

(72) Inventors: Joshua Feast, Boston, MA (US); Ali Azarbayejani, Boston, MA (US); Skyler Place, Boston, MA (US)

(73) Assignee: Cogito Corporation, Boston, MA (US)

( * ) Notice: Subject to any disclaimer, the term of this patent is extended or adjusted under 35 U.S.C. 154(b) by 0 days.

(21) Appl. No.: 15/264,463

(22) Filed: Sep. 13, 2016

(65) Prior Publication Data

US 2017/0076740 A1 Mar. 16, 2017

Related U.S. Application Data

(60) Provisional application No. 62/218,494, filed on Sep. 14, 2015, provisional application No. 62/218,490, filed on Sep. 14, 2015.

(51) Int. Cl.
*G06F 17/00* (2006.01)
*G10L 15/28* (2013.01)
(Continued)

(52) U.S. Cl.
CPC .............. *G10L 25/63* (2013.01); *G06F 17/00* (2013.01); *G06F 17/27* (2013.01); *G06F 19/00* (2013.01);
(Continued)

(58) Field of Classification Search
CPC ....... G10L 25/63; G10L 15/063; G10L 25/90; G10L 25/66; G10L 15/02; G10L 2015/0635; H04W 88/02
(Continued)

(56) References Cited

U.S. PATENT DOCUMENTS

| 6,480,600 | B1 | 11/2002 | Neyman et al. |
| 6,754,331 | B2 | 6/2004 | McCormack |

(Continued)

OTHER PUBLICATIONS

Hillenbrand, J. and Houde, R. A., Acoustic Correlates of Breathy Vocal Quality: Dysphonic Voices and Continuous Speech, Journal of Speech and Hearing Research, 39:311-321 (1996).
(Continued)

*Primary Examiner* — Seong-Ah A Shin
(74) *Attorney, Agent, or Firm* — Choate, Hall & Stewart LLP; William R. Haulbrook; Alexander D. Augst

(57) ABSTRACT

Systems and methods are provided for analyzing voice-based audio inputs. A voice-based audio input associated with a user (e.g., wherein the voice-based audio input is a prompt or a command) is received and measures of one or more features are extracted. One or more parameters are calculated based on the measures of the one or more features. The occurrence of one or more mistriggers is identified by inputting the one or more parameters into a predictive model. Further, systems and methods are provided for identifying human mental health states using mobile device data. Mobile device data (including sensor data) associated with a mobile device corresponding to a user is received. Measurements are derived from the mobile device data and input into a predictive model. The predictive model is executed and outputs probability values of one or more symptoms associated with the user.

10 Claims, 15 Drawing Sheets

(51) Int. Cl.
*H04W 4/14* (2009.01)
*G06F 19/00* (2018.01)
*G10L 25/63* (2013.01)
*H04L 29/08* (2006.01)
*G10L 25/66* (2013.01)
*G10L 21/0316* (2013.01)
*G06Q 30/02* (2012.01)
*G06F 17/27* (2006.01)
*G10L 25/90* (2013.01)
*G10L 15/02* (2006.01)
*G10L 15/187* (2013.01)

(52) U.S. Cl.
CPC .......... *G06Q 30/0269* (2013.01); *G10L 15/28* (2013.01); *G10L 21/0316* (2013.01); *G10L 25/66* (2013.01); *H04L 67/22* (2013.01); *H04W 4/14* (2013.01); *G10L 15/02* (2013.01); *G10L 15/187* (2013.01); *G10L 25/90* (2013.01)

(58) Field of Classification Search
USPC .......................................................... 704/234
See application file for complete search history.

(56) References Cited

U.S. PATENT DOCUMENTS

| | | | |
|---|---|---|---|
| 7,606,718 B2 | 10/2009 | Cloran | |
| 7,644,057 B2* | 1/2010 | Nelken | G06F 17/2705 704/255 |
| 8,068,599 B2 | 11/2011 | Sarin et al. | |
| 8,078,470 B2 | 12/2011 | Levanon et al. | |
| 8,204,747 B2 | 6/2012 | Kato et al. | |
| 8,537,983 B1 | 9/2013 | Haggerty et al. | |
| 8,744,979 B2* | 6/2014 | Sundelin | G06Q 10/107 706/12 |
| 8,798,255 B2* | 8/2014 | Lubowich | G10L 15/142 379/265.09 |
| 8,838,523 B2* | 9/2014 | Stergiou | G06F 19/3418 706/59 |
| 9,070,357 B1* | 6/2015 | Kennedy | G10L 15/00 |
| 10,096,319 B1* | 10/2018 | Jin | G10L 25/63 |
| 2004/0249639 A1 | 12/2004 | Kammerer | |
| 2006/0233346 A1 | 10/2006 | McIlwaine et al. | |
| 2007/0162283 A1* | 7/2007 | Petrushin | G10L 17/26 704/255 |
| 2007/0195945 A1 | 8/2007 | Korenblit et al. | |
| 2008/0103781 A1 | 5/2008 | Wasson et al. | |
| 2010/0217595 A1* | 8/2010 | Kim | G10L 17/26 704/250 |
| 2010/0246799 A1* | 9/2010 | Lubowich | G10L 15/142 379/265.09 |
| 2011/0033036 A1 | 2/2011 | Edwards et al. | |
| 2011/0178803 A1 | 7/2011 | Petrushin | |
| 2011/0282663 A1 | 11/2011 | Talwar et al. | |
| 2011/0295623 A1* | 12/2011 | Behringer | G06Q 10/10 705/4 |
| 2011/0307258 A1 | 12/2011 | Liberman et al. | |
| 2012/0089396 A1* | 4/2012 | Patel | G10L 25/00 704/249 |
| 2012/0158504 A1* | 6/2012 | Kumar | G06Q 30/0255 705/14.53 |
| 2013/0177148 A1 | 7/2013 | Lee | |
| 2013/0195302 A1 | 8/2013 | Meincke et al. | |
| 2014/0052474 A1* | 2/2014 | Madan | G06F 19/3418 705/3 |
| 2014/0140497 A1 | 5/2014 | Ripa et al. | |
| 2015/0264177 A1 | 9/2015 | Feast et al. | |
| 2015/0348570 A1 | 12/2015 | Feast et al. | |
| 2017/0289166 A1* | 10/2017 | Self | H04L 63/102 |

OTHER PUBLICATIONS

International Search Report, PCT/US2016/051549, 3 pages, dated Dec. 28, 2016.
Laskowski, K. et al., An Instantaneous Vector Representation of Delta Pitch for Speaker-Change Prediction in Conversational Dialogue Systems, IEEE, ICASSP, 5041-5044 (2008).
Laskowski, K. et al., The Fundamental Frequency Variation Spectrum, FONETIK, 12 pages (2008).
Lindblom, Björn, Explaining Phonetic Variation: A Sketch of the H&H Theory, Speech Production and Speech Modelling, 403-439 (1990).
Lugger, M. et al., Robust Estimation of Voice Quality Parameters Under Real World Disturbances, IEEE, Proceedings of ICASSP, I-1097-I-1100 (2006).
Morgan, N. and Fosler-Lussier, E., Combining Multiple Estimators of Speaking Rate, International Conference on Acoustic, Speech, and Signal Processing (ICASSP-98) 729-732 (1998).
Scherer, S. et al., Self-reported symptoms of depression and PTSD area ssociate with reduced vowel space in screening interviews, IEEE Transactions on Affective Computing, 99:1949-3045 (2015).
Written Opinion, PCT/US2016/051549, dated Dec. 28, 2016, 12 pages.

* cited by examiner

| | | | | | | | |
|---|---|---|---|---|---|---|---|
| A1 | Depressed Mood Most of the Day | Depression | Depression | V1: | DV1.mean + EPDC.mean + SD2.mean \| (gender x age) | 0.375 | 0.718 |
| | | | | V2: | (SD2.mean)(DV1.mean) + EPDC.mean + SD2.mean + (SD2.mean)(SD2.sd) + | | |
| A2 | Diminished Interest or Pleasure in All or Most Activities | Interest | Depression | V1: | call.out.sum + sms.address.count + travel.distance.sum \| age (no age variable was used to predict) | 0.607 | 0.562 |
| | | | | V2: | sms.address.count + travel.distance.sum | | |
| A4 | Insomnia or Sleeping Too Much | Sleep | Depression | V1: | call.out.sum + sms.address.count + travel.distance.sum \| gender | 0.416 | 0.252 |
| | | | | V2: | call.out.sum + sms.address.count | | |
| A6 | Fatigue or Loss of Energy | Fatigue | Depression | V1: | call.out.sum + sms.address.count + travel.distance.sum \| gender | 0.648 | 0.752 |
| | | | | V2: | call.out.sum + sms.address.count | | |
| A8 | Diminished Ability to Think or Concentrate, or Indecisiveness | Concentration | Depression | V1: | call.out.sum + sms.address.count \| (gender x age) | 0.395 | 0.646 |
| | | | | V2: | call.out.sum + travel.distance.sum | | |
| C1 | Avoid Thoughts, Feelings, or Conversations. | Isolation | PTSD | V1: | call.out.sum + sms.address.count \| (gender x age) | 0.666 | 0.647 |
| | | | | V2: | call.out.sum + sms.address.count + (call.out.sum)(sms.address.count) | | |

FIG. 10

SYSTEMS AND METHODS FOR IDENTIFYING HUMAN EMOTIONS AND/OR MENTAL HEALTH STATES BASED ON ANALYSES OF AUDIO INPUTS AND/OR BEHAVIORAL DATA COLLECTED FROM COMPUTING DEVICES

CROSS REFERENCE TO RELATED APPLICATIONS

This application claims priority to and the benefit of U.S. Provisional Patent Application Ser. No. 62/218,494, filed Sep. 14, 2015, entitled "Systems and Methods for Identifying Human Emotions Based on Analyses of Audio Inputs," and U.S. Provisional Patent Application Ser. No. 62/218,490, filed Sep. 14, 2015, entitled "Systems and Methods for Identifying Human Mental States Based on Analyses of Behavioral Data Collected from Computing Devices," the disclosures of which are incorporated herein by reference in their entireties.

FIELD OF THE INVENTION

This invention generally relates to analysis of audio inputs and/or behavioral data, and more particularly to systems and methods for identifying human emotions and/or mental health states based on analyses of audio inputs and/or behavioral data collected from computing devices.

BACKGROUND

Human-computer interaction refers to the communications and cooperation between humans and computers. Traditionally, such interactions with computers have occurred via WIMP (i.e., windows, icon, mouse, and point-and-click) interfaces. The rapid growth in diversity and complexity of computers (or computing devices) has resulted in the expansion of interfaces with which humans and computers interact.

Mobile devices (e.g., mobile phones, PDAs, portable media players, e-readers, handheld game consoles) and wearable devices (e.g., smart glasses, watches, bands, jewelry, earbuds), for example, require more applicable and modern, non-WIMP interfaces. WIMP interfaces such as a keyboard or mouse traditionally require a surface or the like on which they can be operated. Such interfaces are therefore not useful or suitable for modern computers including mobile and wearable devices. Instead, more suitable interfaces (e.g., hands-free interfaces) such as speech recognition, eye tracking and lip reading interfaces are becoming more common for human-computer interactions, particularly with mobile and wearable devices.

Speech recognition, while frequently used with mobile and wearable devices, is also used with a wide variety of computing devices or machinery, including appliances, automobiles, aircrafts, and the like. Such devices are often referred to as "voice command devices" because they can be controlled by means of human voice rather than using buttons, dials, switches, and the like. One common use of speech recognition is for voice user interfaces, which enable functionality such as voice dialing, call routing, appliance control, searching, data entry, document drafting, speech-to-text processing, aircraft operation, selecting radio stations, and playing music. Voice user interfaces have valuable applications in a range of industries including education, telephony, aerospace, video games, robotics, training, military, health care, and the like.

Voice user interfaces function by, first, recognizing audio input. Audio inputs may be prompts (e.g., "computer"), which activate and/or prepare the computing device for further input. Audio inputs may also and/or alternatively be commands (e.g., "send a text," "call contact"), which instruct the computing device to take or perform one or more specified actions. The computing device, interacting with its software and/or an operating system, processes the prompt and/or command and, for example, retrieves information, carries out a task, or the like, based on (e.g., referencing, relying on) the lexical content of the audio input. Often, the audio input causes a mistrigger, which refers to a failure by the computing device to recognize and/or process the audio input. Mistriggers may be caused by poor quality of the audio input, grammatical errors, incomplete prompts or commands, unrecognizable accents, under-articulated speech, and the like.

One technical challenge with the use of voice user interfaces or speech recognition involves the ability to obtain information from the audio input based on the non-lexical portions of the speech. There is a need, therefore, for systems and methods that can, for example, infer human emotional states, intentions and behaviors, from the non-lexical portions of human speech. More particularly, for instance, there is a need for systems and methods that can predict the probability that mistriggers have occurred based on how (e.g., non-lexical) a user speaks in an audio input to a voice user interface.

Further, there is a fast and continuous increase in the number and types of computing devices and systems that generate data. That is, data-generating devices and systems have evolved from common desktop and laptop computers to smartphones, tablets, mobile devices, wearable devices, and the like. In fact, just about any piece of machinery, structure, or good is now capable of generating data, for example, using embedded sensors.

Typically, sensors are systems that allow for eliciting and/or collecting information. Sensors can be embedded, fixed, adhesive, movable, and wearable. Moreover, sensors can be used to obtain information (e.g., sense) about almost any parameters including humidity, temperature, pressure, force, light, images, speech, sound, gestures, touch, presence, proximity, activity, motion, location, and more.

Yet, data generated by sensors is merely an example of the vast amount of information that is being, and will be, generated and stored by computing devices. In fact, computing devices produce and/or store a number of different types of structured, semi-structured and unstructured data including user information, interactions, files (e.g., audio, video), communications (e.g., email, calls, short message service (SMS), transactions, and the like. All of this data is in turn multiplied by systems that generate additional data about the data (e.g., metadata). That is, the generated data is analyzed to identify, create and/or store correlations, patterns, signs, and more, which in turn are used in a number of industries (e.g., business, medical, government) to, for example, make better decisions, increase efficiency, minimize risk, and prevent unwanted outcomes.

In other words, data that is produced by computing devices is being used in a plethora of ways, many of which include personalizing and/or targeting decisions, information, predictions and the like for users, based in part on data generated by or about each user. For example, data generated by a user's computing device or devices (e.g., mobile device, wearable device), such as transaction information, location information, and the like can be used to identify and/or infer that user's preferred shopping times, days, stores, price points, and more. In turn, the identified and/or inferred information can be used to deliver targeted or personalized coupons, sales, and promotions, particularly at times or locations most proximate to the user's preferences.

Data generated by personal computing devices is also being used to diagnose, prevent and/or treat medical conditions. Wearable devices, for example, are often embedded with sensors such as heart rate and motion monitors. The data generated by these sensors can be used to track a user's physical well-being, monitor progress, and customize treatments. However, such data is typically used in connection with physical health states or conditions.

There is a need, therefore, for systems and methods for identifying mental health states based on data collected from computing devices. More particularly, for instance, there is a need for systems and methods for identifying symptoms and/or disorders of users based on behavioral data collected from the users' computing devices.

SUMMARY

Systems and methods are presented herein for analyzing audio inputs, and more particularly for identifying human emotions based on the analyses of audio inputs.

In one aspect, the invention is directed to a method for analyzing voice-based audio inputs, the method comprising: receiving (e.g., via a microphone, retrieving from memory), by the processor, a voice-based audio input associated with a user (e.g., wherein the voice-based audio input is a prompt or a command); extracting, by the processor, measures of one or more non-lexical features from the voice-based audio input; calculating, by the processor, one or more parameters based at least in part on the measures of the one or more features; and identifying, by the processor, the occurrence of one or more emotional states of the user (e.g., frustration, e.g., caused by unsuccessful voice-based audio command or speech recognition) by inputting the one or more parameters (e.g., extracted from the voice-based audio input) into a predictive model.

In certain embodiments, the one or more features include at least one member selected from the group consisting of articulation space, pitch, pitch variation, energy, envelope peaks, and vocal effort. In certain embodiments, the one or more parameters include one or more of a mean and a standard deviation of the measures of the one or more features. In certain embodiments, the one or more parameters include a mean of envelope peaks, a mean of vocal effort, and a mean of pitch variation.

In certain embodiments, the method further comprises generating the predictive model using sample sets of voice-based audio inputs with associated measures of features comprising at least one member selected from the group consisting of envelope peaks, a mean of vocal effort, and a mean of pitch variation.

In certain embodiments, extracting of the measures of the one or more features from the voice-based audio input includes: normalizing the loudness of the voice-based audio input; adjusting a frequency of the voice-based audio input (e.g., to 8 kHz); converting the voice-based audio input to a mono-audio file; and identifying, using a configuration file, the one or more features for which the measures are to be extracted. In certain embodiments, the configuration file includes a definition of the predictive model. In certain embodiments, the configuration file instructs the processor to compute the one or more features and apply the predictive model.

In certain embodiments, the method is operable to be performed using an operating system (e.g., Android, iOS, Windows Phone) executed by the computing device (e.g., mobile device). In certain embodiments, the computing device includes one or more of a mobile device, wearable device, and laptop.

In certain embodiments, the predictive model is retrained by: receiving a plurality of voice-based audio inputs, each of the plurality of voice-based audio inputs including one or more features; and updating the predictive model based on at least a portion of the voice-based audio inputs.

In certain embodiments, the method comprises automatically, predicting, understanding, and/or responding to one or more of emotional states, intentions and behaviors of a human based on an analysis of the measures of the one or more features of the voice-based audio input, wherein the voice-based audio input is received from the human. In certain embodiments, the method further comprises identifying relevant advertisements using the determined one or more of the human emotional states, intentions and behaviors corresponding to the user, by inputting the one or more parameters into the predictive model.

In another aspect, the invention is directed to a system for analyzing voice-based audio inputs, the system comprising: a memory operable to store a configuration file, the configuration file include a definition of a predictive model, and a processor communicatively coupled to the memory, the processor being operable to: receive (e.g., via a microphone, retrieving from memory) a voice-based audio input (e.g., prompt, command) associated with a user; extract measures of one or more features from the voice-based audio input, the one or more features including at least one of articulation space, pitch, energy, envelope peaks, and vocal effort; calculate one or more parameters based at least in part on the measures of the one or more features, the one or more parameters including at least one of a mean and a standard deviation of the one or more features; and identify the occurrence of one or more emotional states (e.g., frustration, e.g., from unsuccessful voice-based audio inputs) by inputting the one or more parameters (e.g., extracted from the voice-based audio input) into the predictive model. In certain embodiments, the one or more parameters include a mean of envelope peaks, a mean of vocal effort, and a mean of pitch variation.

In one aspect, the invention is directed to a method for identifying human mental health states using mobile device data, the method comprising: receiving (e.g., from memory, sensors, connected device), by a processor, mobile device data, the mobile device data being associated with a mobile device (e.g., smartphone, wearable device) corresponding to (e.g., operated by) a user, and the mobile device data comprising one or more of: (1) sensor data, the sensor data being obtained from sensors of the mobile device corresponding to the user, wherein the sensors include one or more of an accelerometer, a gyroscope, and a global positioning system (GPS), and (2) usage data, the usage date including one or more of a call log, a short message service (SMS) log, screen state, voice data and battery life; storing the mobile device data in a memory associated with the mobile device (e.g., mobile device memory, cloud-based storage); deriving, by the processor, measurements from the mobile device data (e.g., call.out.sum, trave.distance.sum, sms.address.count); and determining, by the processor, one or more predictive model outputs based on the derived measurements from the mobile device data, the one or more predictive model outputs comprising probability values of one or more symptoms (e.g., DSM-IV-TR or DSM-V symptoms, e.g., depression symptoms (e.g., depressed mood most of the day; diminished interest or pleasure in all or most activities; insomnia or sleeping too much; fatigue or loss of energy; or diminished ability to think or concentrate, or indecisiveness), and/or PTSD symptoms (e.g., avoid thoughts, feelings or conversations; avoid activities, places, people; diminished interest or participation in significant activities; feeling of detachment or estrangement from others; difficulty falling or staying asleep; irritability or outburst of anger), fatigue, isolation, and/or depression), the probability values indicating the likelihood of the one or more symptoms being present in the user based on the derived measurements from the mobile device data associated with the mobile device.

In certain embodiments, the mobile device data includes behavioral data, the behavioral data comprising the sensor data and the usage data, and the predictive model is a behavioral data model for identifying mental health states of the user based on the behavioral data.

In certain embodiments, the method further comprises determining, by the processor, based on the output probability values of the one or more symptoms associated with the user, one or more disorders (e.g., PTSD, depression) suffered by the user.

In certain embodiments, the behavioral data model is trained using measurements of raw features collected from a plurality of mobile devices, the raw features including one or more of: (i) call features including, for each of a plurality of calls, one or more of: time, telephone number, outcall indicator, incall indicator, missed call indicator, and duration; (ii) short message service (SMS) features including, for each of a plurality of SMS messages, one or more of: time, phone address, outgoing SMS indicator, and incoming SMS indicator; and (iii) travel features including, for each of a plurality of measured position, at least one of: time when the position was measured, location of the position (e.g., latitude, longitude), and location accuracy of the position. In certain embodiments, the measurements of the raw features include one or more of: (i) periodic (e.g., weekly) call features associated with one of the plurality of mobile devices, the periodic call features including one or more of: call number count, outcall count, incall count, missed call count, call duration count, outcall mean, incall mean, missed call mean, and call duration mean; (ii) periodic (e.g., weekly) SMS features associated with one of the plurality of mobile devices, the periodic SMS features including one or more of: SMS address count, outgoing SMS count, incoming SMS count, elapsed SMS count, incoming SMS mean, outgoing SMS mean, and elapsed SMS mean; and (iii) periodic (e.g., weekly) travel features associated with one of the plurality of mobile devices, the periodic travel features including one or more of: travel distance sum, travel elapsed sum, and travel variance sum.

In certain embodiments, the measurements derived from the mobile device data and input into the predictive model include at least one of: (i) call out sum, indicating the number of calls originated from the mobile device of the user during a given time; (ii) travel distance sum, indicating the total distance traveled by the user while in possession of the mobile device during the given time; and (iii) SMS address count, indicating the number of addresses to which SMS messages were sent during the given time.

In certain embodiments, the mobile device data is passively collected from the mobile device.

In certain embodiments, the processor is embedded in the mobile device of the user, and/or the predictive model is stored in the memory associated with the mobile device of the user.

In certain embodiments, the predictive model further comprises a vocal acoustic data model for identifying human mental health states based on measurements of features extracted from audio data (e.g., audio diaries).

In certain embodiments, the method comprises generating, by the processor, based on a change (e.g., an absolute difference) in the probability values of a subset of one or more of the symptoms, an overview metric (e.g., of overall mental health). In certain embodiments, generating the overview metric comprises: comparing, by the processor, the probability values of the subset of the one or more symptoms with a previously stored set of probability values for the one or more symptoms (e.g., the previously stored set of probability values comprising a daily log of probability values, e.g., the previously stored set of probability values comprising probability values for each of the previous six days); determining, by the processor, a change (e.g., an absolute difference, e.g., an absolute difference between probability values each day) in the probability values for each symptom of the subset of the one or more symptoms; calculating, by the processor, an average (e.g., mean) change in the probability values for each symptom of the subset of the one or more symptoms; and generating, by the processor, the overview metric, the overview metric comprising an average (e.g., a mean, e.g., a weighted mean) of the average change in the probability values for each symptom of the subset of the one or more symptoms. In certain embodiments, generating the overview metric comprises: computing, by the processor, for each symptom of the subset of the one or more symptoms, a set of absolute differences in value between each adjacent index in a set of probability vectors (e.g., wherein if there is a missing index, the absolute difference is not computed for that index), a first probability vector comprising a first probability value for a first symptom of the subset of the one or more symptoms, and probability values for each entry for the first symptom in the previously stored set of probability values (e.g., wherein the first probability vector comprises a daily log of the probability value for the first symptom, e.g., wherein the first probability vector comprises probability values for the current day and each of the previous six days); summing, by the processor, each of the sets of absolute differences, thereby generating a set of sums of absolute differences; dividing, by the processor, each of the set of sums of absolute differences by a total number of pairwise comparisons made for each of the symptoms of the subset of the one or more symptoms (e.g., wherein missing indexes do not count towards the total), thereby generating a set of probability value averages; and calculating, by the processor, an average (e.g., a mean) of the set of probability value averages, thereby generating the overview metric.

In another aspect, the invention is directed to a method for identifying human mental health states using mobile device data, the method comprising: receiving, by a processor, mobile device data associated with a mobile device corresponding to a user, the mobile device data including one or more audio diaries; extracting, by the processor, one or more first measurements of features from each of the audio diaries, the extracting including one or more of: (i) normalizing loudness of the audio diaries; (ii) downsizing the audio diaries; (iii) converting the audio diaries to mono-audio files; and (iv) identifying the features from which the one or more first measurements are to be extracted based on a vocal acoustic data model defined in a configuration file; deriving, by the processor, second measurements of the features based on the first measurements of the features; inputting, by the processor, the second measurements of the features into the vocal acoustic data model; and executing, by the processor, the vocal acoustic data model to obtain probability values of one or more symptoms, the probability values indicating the likelihood of the one or more symptoms being present in the user based on the input second measurements of the features.

In certain embodiments, the first measurements of the features include one or more of pitch variation and vocal effort. In certain embodiments, the second measurements of the features include one or more of a standard deviation of pitch variation, a mean of vocal effort, and a standard deviation of vocal effort. In certain embodiments, the vocal acoustic data model is defined by the formula: StdevVocalEffort+MeanVocalEffort+StdevPitchVar.

In another aspect, the invention is directed to a system for identifying human mental health states using mobile device data, comprising: a memory operable to store a predictive model; and a processor communicatively coupled to the memory, the processor being operable to: receive (e.g., from memory, sensors, connected device) mobile device data, the mobile device data being associated with a mobile device (e.g., smartphone, wearable device) corresponding to (e.g., operated by) a user, and the mobile device data comprising one or more of: (1) sensor data, the sensor data being obtained from sensors of the mobile device corresponding to the user, wherein the sensors include one or more of an accelerometer, a gyroscope, and a global positioning system (GPS), and (2) usage data, the usage date including one or more of a call log, a short message service (SMS) log, screen state, voice data and battery life; store the mobile device data in the memory; derive measurements from the mobile device data (e.g., call.out.sum, trave.distance.sum, sms.address.count); input the derived measurements from the mobile device data into a predictive model (e.g., behavioral data model); execute the predictive model, wherein the predictive model outputs probability values of one or more symptoms (e.g., DSM-IV-TR or DSM-V symptoms, e.g., depression symptoms (e.g., depressed mood most of the day; diminished interest or pleasure in all or most activities; insomnia or sleeping too much; fatigue or loss of energy; or diminished ability to think or concentrate, or indecisiveness), and/or PTSD symptoms (e.g., avoid thoughts, feelings or conversations; avoid activities, places, people; diminished interest or participation in significant activities; feeling of detachment or estrangement from others; difficulty falling or staying asleep; irritability or outburst of anger), fatigue, isolation, and/or depression), the probability values indicating the likelihood of the one or more symptoms being present in the user based on the derived measurements from the mobile device data associated with the mobile device.

The description of elements of the embodiments with respect to one aspect of the invention can be applied to another aspect of the invention as well. For example, features described in a claim depending from an independent method claim may be applied, in another embodiment, to an independent system claim.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIG. 10 illustrates models for identifying human emotional stress based on behavioral data and/or audio diary signals, in accordance with an exemplary embodiment.

DETAILED DESCRIPTION

Figure 1:
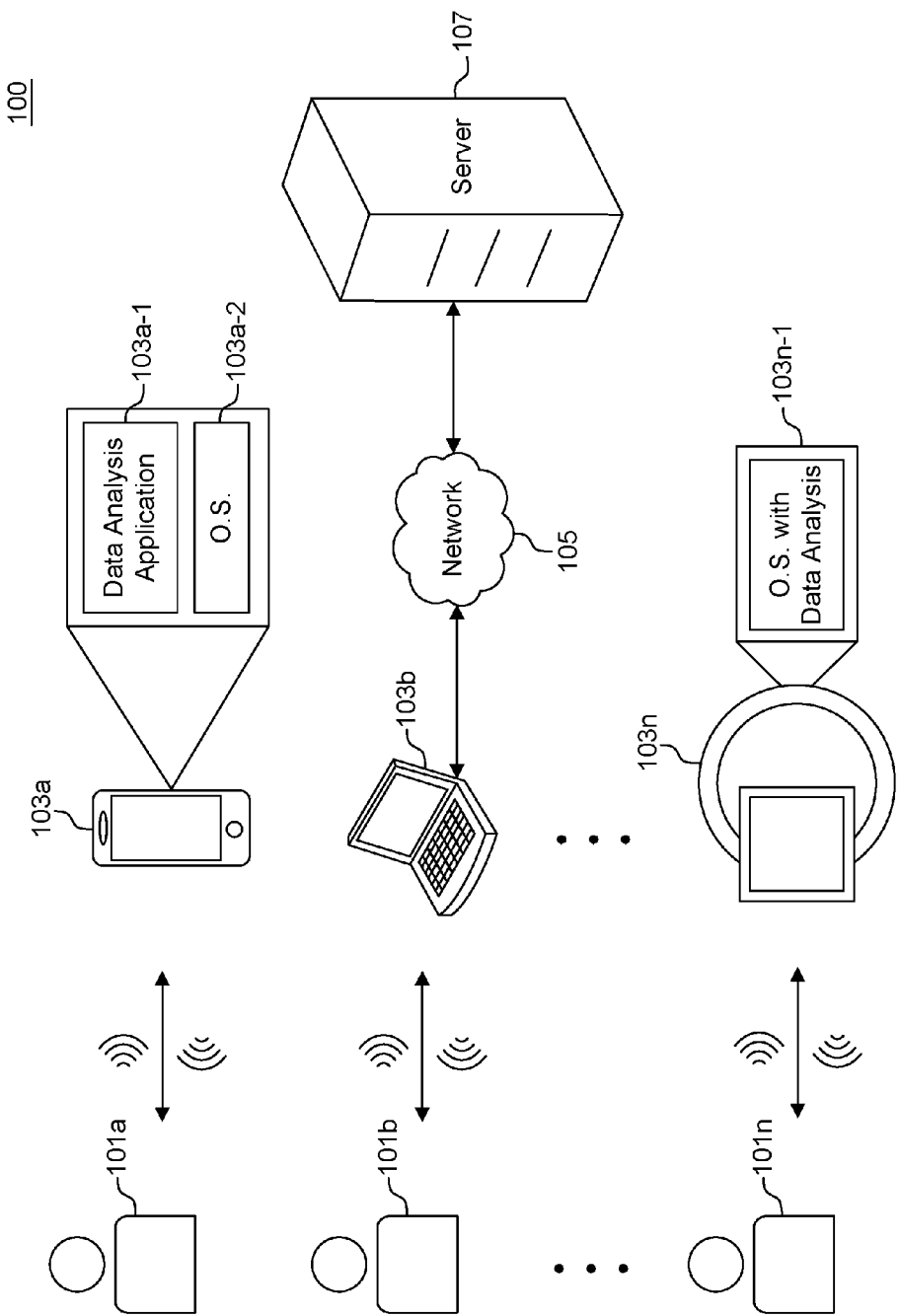
FIG. 1 is illustrates a system architecture for analyzing audio inputs according to an exemplary embodiment.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

Throughout the description, where articles, devices, and systems are described as having, including, or comprising specific components, or where processes and methods are described as having, including, or comprising specific steps, it should be understood that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing actions is immaterial so long as the invention remains operable. Moreover, two or more steps or actions may be conducted simultaneously.

The mention herein of any publication or patent application, for example, in the Background section, is not an admission that such publication or patent application constitutes prior art with respect to any of the claims or subject matter presented herein. The Background section is presented for purposes of clarity and is not intended to be a description of prior art with respect to any claim.

System

FIG. 1 illustrates an exemplary system architecture 100 for analyzing audio inputs, for example, to determine human emotional states and/or for identifying human mental health states based on analyses of data collected from computing devices operated by users, according to an exemplary embodiment. As shown in FIG. 1, system architecture 100 includes users 101a, 101b, . . . , and 101n (collectively "users," "users 101," or "101"). Each of the users 101 is associated with a corresponding computing device, including mobile device 103a, laptop 103b, . . . , and wearable device 103n (collectively "computing devices," "computing devices 103," or "103"). That is, each user may be the owner, manager or operator of a corresponding computing device. It should be understood that although each of the users 101 is associated with a single computing device in FIG. 1, a user may be associated with multiple computing devices, and each computing device may be associated with multiple users. The computing devices 103 can also include desktop computers, tablets, machinery, automobiles and any computing device or machinery operable to receive, store, process and/or transmit audio inputs and/or data, including sensor or usage data.

The computing devices 103 include at least a processor and a memory, and can have stored thereon or associated therewith, applications and/or an operating system (OS). The computing devices 103 further include audio input and/or output means, such as one or more of a microphone, speakers, or the like. Moreover, the computing devices 103 may have (e.g., embedded thereon or connected thereto) one or more sensors such as an accelerometer, gyroscope, magnetometer, global positioning system (GPS), as well as sensors for measuring temperature, gravity, light, orientation, proximity, relative humidity, pressure, rotation, battery, touch, and the like. Sensors generate data on a continuous or periodic basis. Typically, the sensor data is associated with other information such as a timestamp (e.g., date and time of sensor reading), corresponding device or user, and the like. In some example embodiments, data generated by sensors is stored and/or processed by the computing devices 103 and/or their associated systems (e.g., third party platforms). In some example embodiments, data generated by sensors may be collected and managed by one or more of applications or the operating systems of the computing devices 103.

In some example embodiments, the mobile device 103a is an Apple iPhone, Samsung Galaxy, HTC One, or the like. Moreover, the mobile device 103a may include an operating system 103a-2 such as iOS, Android, Windows Phone, BlackBerry, and the like. The mobile device 103a may also include a data analysis application, which is used to execute a predictive model (e.g., behavioral data model, vocal acoustic model, combination thereof) on the mobile device. The laptop 103b may be an Apple MacBook Air, Dell Inspiron, HP Stream, or the like. The laptop 103b may include an operating system such as Mac OS, Microsoft Windows, Linux, or the like. The wearable device 103n may be an Apple Watch, Samsung Gear, Motorola Moto, or the like. The wearable device 103n may include an operating system 103n-1 such as Watch OS, Android Wear, Tizen, LinkIt or the like. The operating system 103n-1 of the wearable device 103n may include built in functionality for performing data analysis by executing a predictive model (e.g., behavioral data model, vocal acoustic model, combination thereof).

In some example implementations, the computing devices 103 include mobile assistance functionality (or "mobile assistant," "intelligent personal assistant") such as Siri, Cortana and Microsoft Now. Mobile assistants or intelligent personal assistants can be controlled via audio inputs (e.g., voice control, commands, prompts) that are processed with voice or speech recognition technology. Mobile assistance functionality may be provided as or by a stand-alone application, part of an application, or part of the operating system. For example, as shown in FIG. 1, mobile device 103a includes a stand-alone audio analysis application 103a-1 and an operating system 103a-2. The audio analysis application 103a-1 is used to receive, retrieve and/or process audio inputs, as described in further detail below with reference to FIGS. 2-5. The wearable device 103n includes an operating system 103n-1, which is an operating system 103n-1 with integrated audio analysis functionality. That is, the operating system 103n-1 receives, retrieves and/or processes audio inputs such as commands or prompts.

Although not illustrated in FIG. 1, the laptop 103b includes an operating system and/or applications capable of receiving audio inputs, collecting, processing (e.g., analyzing) and managing device data (e.g., mobile device data) including behavioral data (e.g., sensor and usage data) and stored data (e.g., audio files). However, rather than providing data (e.g., audio data) analysis functionality on the laptop 103b, the laptop 103b transmits the data (e.g., audio data, behavioral data, stored data) to a server 107 via a network 105. Examples of networks (e.g., network 105) include the Internet, a wide area network (WAN), virtual private network (VPN), storage area network (SAN), global area network (GAN), enterprise private network, local area network (LAN), third-party network, and the like.

The server 107 may be a platform managed by a data (e.g., behavioral data (e.g., sensor and usage data)) analysis service provider, a scalable cloud environment, a hosted centralized onsite server, or the like. The server 107 may be communicatively coupled with other third party platforms, in order to provide or perform other services on the data (e.g., audio data). In turn, the server 107 processes (e.g., analyses) received data (e.g., audio data, sensor and/or usage data) from the laptop 103b, e.g., by executing a predictive model (e.g., behavioral data model, vocal acoustic model) and transmits results from the analysis back to the laptop 103b via the network 105. Behavioral data (e.g., sensor and usage data) and/or audio data, including the analysis thereof, is described in further detail below with reference to FIGS. 2-12.

In some example implementations, audio data is analyzed using a predictive model. The predictive model may be defined in and/or by a configuration file. For example, the configuration file may define the measures of features to be used by the model. The predictive model uses audio features (e.g., envelope peaks, pitch variation, vocal effort) or measures thereof, for example, to identify human emotional states, intentions, behaviors, and the like, which in turn can be used recognize the occurrence of mistriggers. It should be understood that other audio features or measures thereof may be used with the predictive model, including features that describe speaking style and/or prosodic features. Prosodic features indicate the emotional state of the speaker, the form of the utterance (e.g., statement, question, command), the presence of irony or sarcasm, emphasis, contrast, focus and the like.

In some example implementations, data (e.g., behavioral data (e.g., sensor and/or usage data)) is analyzed using a predictive model. The predictive model is executed, for example, by an application on or the operating system of a computing device or connected system (e.g., server). For example, the predictive model may be a behavioral data model or a vocal acoustic data model. Predictive models may be defined in and/or by a configuration file. In some example implementations, behavioral data models use behavioral data (e.g., data collected from sensors of a computing device) and/or usage data (e.g., device data, data regarding the use of the device and/or its applications, and the like) from the computing devices, to calculate the probability of symptoms and/or identify the existence of disorders in users of the computing devices. It should be understood that other types of data may alternatively and/or additionally be used in or with behavioral data models. In some example implementations, vocal acoustic data models use audio data (e.g., speech audio, audio diary) from or associated with computing devices, to calculate the probability of symptoms and/or identify the existence of disorders in users of the computing devices.

In some example implementations, predictive models (and/or the configuration files defining the models) are stored in the computing devices 103 and/or the server 105. In other example implementations, predictive models (and/or the configuration files defining the models) are stored in a cloud or data center accessible by the computing devices 103 via one or more networks (e.g., network 105).

In some example embodiments, each of the computing devices 103 has stored thereon device information such as data about its hardware, software and/or user. For example, each of the computing devices 103 may store a device identifier, device type, memory usage, SIM identifier, and user information (e.g., name, age, gender, and the like).

Analyzing Audio

Figure 2:
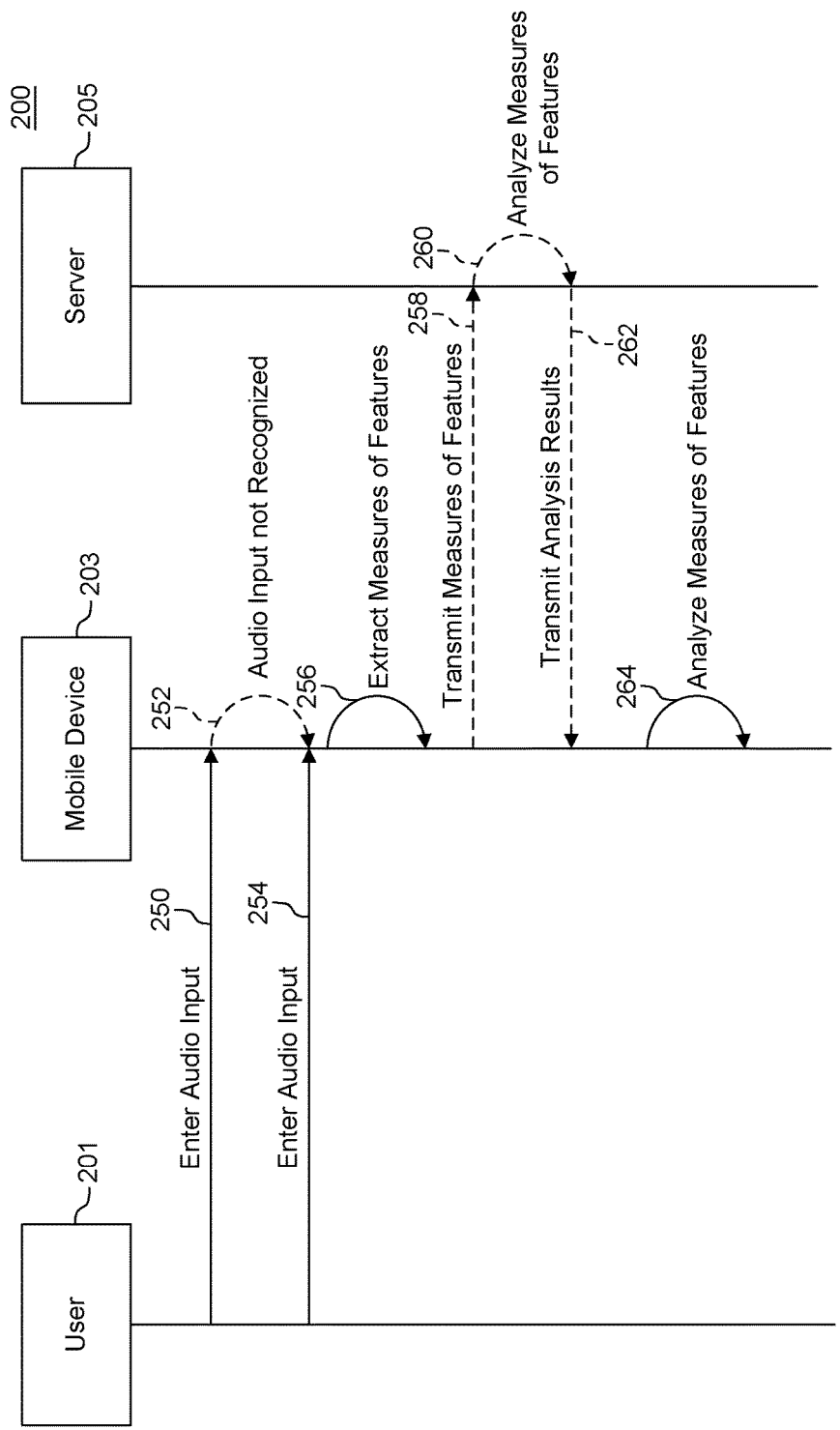
FIG. 2 illustrates a sequence diagram for analyzing audio data and identifying prior mistriggers, according to an exemplary embodiment.

FIG. 2 illustrates a sequence diagram 200 for analyzing audio data and identifying prior mistriggers, according to an exemplary embodiment. In some example implementations, the audio data is a short utterance such as a command or prompt. Mistriggers refer to voice-based audio inputs that are not successfully recognized and/or processed by a computing device. In FIG. 2, a user 201 (e.g., FIG. 1, user 101*a*) operates a mobile device 203 (e.g., FIG. 1, mobile device 103*a*). In one example embodiment, a user 201 enters a voice-command audio input into the mobile device 203 via the microphone of the mobile device, at step 250. At step 252, the audio input is not recognized and/or processed by the mobile device 203. That is, the mobile device 203 fails to recognize and/or process the audio input due to, for example, lack of clarity, background noise, speed, accent, and the like. In some implementations, the mobile device 203 transmits a notification (e.g., audio notification) to the user 201 indicating that the audio input entered at step 250 was not recognized and/or processed.

In turn, the user 201 attempts to enter another voice-command audio input, at step 254. The mobile device 203 receives the audio input and extracts features or measures of the features from it. In some example implementations, extracting measures of the features from an audio input includes one or more of: (1) downsizing the sample, (2) converting the sample to mono-audio file, and (3) using a configuration file to identify the measures of features to be extracted. In some example implementations, a YAML configuration file specifies the acoustic features to be computed, inputted into the model, and what model type and coefficients are applied in order to produce the model output. This configuration file is parsed in order to set up the computational pipeline as requested.

Normalizing loudness is a process of normalization of the measure of loudness of the audio input, in which the average amplitude is set (e.g., reduced) to a target level. The average amplitude is the measurement of average power (e.g., root mean square value) of the audio input.

Downsampling an audio file is a process of reducing the sampling rate of a signal from an existing rate to a lower rate, for example, 8 kHz. Downsampling reduces the number of digital audio samples which in turn reduces the storage requirement for a given audio file. The rate of downsampling is in a proportion similar to or equal to the storage reduction.

Converting the sample to mono (or monophonic) refers to the process of mixing multiple audio signals (e.g., stereo or stereophonic) into a single channel, in order to produce a signal output that can be consumed at the same sound levels, for example, by multiple listeners or devices. Finally, identifying the measures of the features to be extracted includes referencing the model definition in the configuring file and obtaining values of characteristics from and concerning the cleaned audio file accordingly. That is, in some example embodiments, a configuration file including a predictive model definition is used to determine the measures of features to be extracted from the audio files. Examples of the measures of features that are extracted from the audio file include:

a. Articulation Space—is an algorithm which is designed to discriminate between under- or hypo-articulated, less-clear speech and enunciated, hyper-articulated speech. The algorithm is a novel development of previously published algorithms (e.g., Scherer et al., *Self-reported symptoms of depression and PTSD are associated with reduced vowel space in screening interviews*, IEEE Transactions on Affective Computing, 99. (2015)) based on the speech science work by Lindblom, *Explaining Phonetic Variation: A Sketch of the H&H Theory*, In: Speech Production and Speech Modeling, pp. 403-439. (1990). Rather than estimate resonance (or "formant") tracks, a process which is known to lack robustness and have strong gender dependency, Mel-frequency Cepstral Coefficients (MFCCs) are computed and are linearly combined. The coefficients for this linear combination are derived by training linear models with labeled training data. Two sets of training labels are used: 1) vowel height and 2) vowel backness vs frontness, resulting in two linear models with the same MFCC inputs. The output of the two linear combinations can be considered to be 2-dimensional co-ordinates. By extracting these co-ordinates from an amount of speech (typically greater than 2 minutes), one can then measure their dispersion, which is the Articulation Space measure. A large dispersion indicates clear, hyper-articulation whereas low dispersion indicates hypo-articulation.

b. Pitch Variation—is an algorithm used to assess adjacent magnitude fast Fourier transform (FFT) spectra. Spectra are dilated or contracted and compared by computation of dot-products. The dilation and contraction is done systematically in a realistic range of possible fundamental frequency variations (e.g., within a certain duration of time) on the octave scale. The output of this is the fundamental frequency variation (FFV) spectrum. If a speaker's pitch is not varying over adjacent frames, the FFV presents a strong central peak. A falling pitch results in an FFV with a peak skewed to the left, and a rising pitch causes a peak to the right of the FFV spectrum. To compress this spectrum, five trapezoidal filters are applied to the FFV spectrum, resulting in five features. In some example implementations, settings, including FFT frame durations and the dilation/contraction range, are modified to better suit realistic pitch movements, and the space between compared FFT frames is increased in order to better allow time for pitch changes. Additionally, in some example implementations, the measures of feature data is dimensionally reduced to a single measure by linear combination, using the weight coefficients derived using Principal Component Analysis (PCA) of previously obtained speech data with different degrees of pitch variation. That is, the pitch variation feature measure provides low values for monotonous, non-varying pitch and high values for highly dynamically varying pitch. In some examples, the single dimensionally-reduced pitch variation features are used, whereas in other examples, five non-dimensionally reduced features are used. Examples of pitch variation calculation may be found in Laskowski et al., *An instantaneous vector representation of delta pitch for speaker-change prediction in conversational dialogue systems*, ICASSP (2008), the contents of which are incorporated herein by reference in their entirety.

c. Energy—is the squared magnitude of the digital audio signal. In some example implementations, this quantity is normalized by the maximum audio level.

d. Envelope Peaks—refers to locations of syllable nuclei, detected by finding peaks in the combined multi-band energy envelope. The mean envelope peaks feature measure is computed by dividing the number of detected peaks by the number of frames containing speech activity over a certain duration of frames. Examples of envelope peak calculation (e.g., algorithm) may be found in Morgan et al., *Combining Multiple Estimators of Speaking Rate*, ICAS SP (1998), the contents of which are incorporated herein by reference in their entirety.

e. Vocal Effort—is a measure of a feature designed to discriminate soft, breathy voices from loud, tense ones. Vocal effort is computed via a linear combination of previously published features. A set of spectral gradients are computed from the FFT magnitude spectrum. Examples of algorithms for calculating spectral gradients may be found in Lugger et al., *Robust Estimation of Voice Quality Parameters Under Realworld Disturbances*, ICASSP (2006), the contents of which are incorporated herein by reference in their entirety. In one example implementation, to determine the frequencies in the magnitude spectrum to compute the gradients, peak-picking in fixed frequency ranges is used. In other example implementations, fundamental frequency (f0) and formant tracking are used to determine the frequencies in the magnitude spectrum to compute the gradients. Three spectral gradients are used to compute the vocal effort feature. In one example, the Cepstral Peak Prominence feature may be used. The Cepstral Peak Prominence feature is described in further detail in Hillenbrand et al., *Acoustic Correlates of Breathy Vocal Quality: Dysphonic Voices and Continuous Speech*, Journal of Speech and Hearing Research, 311-321 (1996), the contents of which are incorporated herein by reference in their entirety. The magnitude Cepstrum, which is essentially the log power FFT spectrum of a log power FFT spectrum, may be used. A peak corresponding to the voice f0 appears in the cepstrum for voiced speech and in may be used in the algorithm to normalize to the magnitude of that same frequency (e.g., cepstral frequency) on a regression line fit to the magnitude cepstrum. In some example implementations, the peak magnitude is normalized to the average cepstral magnitude rather than having to fit a regression line. The four measures of features are linearly combined in a regression model, the weight coefficients for which were derived using speech data with different acted levels of vocal effort.

In some example implementations, the extracted measures of features are used to calculate a variety of additional or alternative measures for each feature, including, for example their standard deviation, mean, as well as combinations thereof.

Once measures of the extracted features are calculated, they are used to perform an analysis of the audio signal from which they were extracted. In some implementations in which a computing device is not equipped with audio analysis functionality, or such analysis is chosen to be performed remotely, the measures of the features are transmitted to a server 205 (e.g., FIG. 1, server 107) for the analysis. In turn, after performing the analysis at step 260, the server 205 transmits results of the analysis back to the mobile device 203, at step 262. In the event that the mobile device 203 is equipped or enabled to perform audio analysis on its own (e.g., without transmitting this information to a server for analysis), the mobile device 203 analyzes the features (or measures of the features) at step 264.

Yet, in other embodiments in which the computing device is equipped with audio analysis functionality, the mobile device 203 performs the analysis of the audio signal using the audio analysis application and/or operating system stored and executing thereon. That is, the measures of the features of the audio signal are not transmitted to the server 205 for analysis.

The analysis of the features (e.g., measures of the features) of the audio signal is performed using a predictive model. The predictive model may be stored on the mobile device or the server, in association with an audio analysis application and/or operating system. The model may be defined in a configuration file which describes the calculations to be performed using at least a portion of the measures of the features of the audio signal. In some example implementations, the model is used to determine, based on the input features of the audio signal, human emotional states, intentions, behaviors, and the like. In one example implementation, the model is used to predict the probability that a mistrigger has previously (e.g., prior to the audio input) occurred. That is, the predictive model is used to predict that the user (e.g., speaker) associated with the audio signal has previously experienced a mistrigger (e.g., failure of the mobile device to recognize an audio input (e.g., command)).

In one example embodiment, the measures of the features that are input into the model include a mean of the envelope peaks measure, the pitch variation measure, and the vocal effort measure, which are described above in further detail. The model (e.g., the configuration file defining the model) determines, for example, that the client has spoken more slowly than in a previous audio signal (e.g., command), in a more tense voice, and/or in a more monotonous voice. Moreover, the model determines, based on the input audio signals, whether a mistrigger has occurred. In some example embodiments, the model calculates and/or provides a probability value of whether or not a mistrigger occurred prior to the audio signal being recorded and/or input into the computing device. The predictive model is described in further detail below with reference to FIGS. 3 to 5.

Modeling Process

The predictive model is used to, among other things, infer human emotional states, intentions and behaviors from non-lexical portions of human speech, in order to predict, understand and respond to human requests, emotional states and needs. In some example embodiments, the predictive model is used to predict the probability that a mistrigger has occurred based on the audio input from a user (e.g., how the user spoke).

To obtain audio recordings used to build the predictive model, participants were sampled online using Amazon's Mechanical Turk. Audio recordings were limited to those from participants having a Mechanical Turk approval rating of higher than approximately 98%. Audio recordings obtained in a noisy environment, or via a computer without a microphone or speaker, were excluded. Participants were asked to record a phrase (e.g., prompt, command) which would lead to a success (e.g., trigger) or a failure (e.g., mistrigger). That is, participants were asked to record multiple phrases that would either cause a trigger or mistrigger. When a mistrigger occurred, participants were asked to record the same phrase multiple times (e.g., 2 or 3 times) until it was successful (e.g., caused a trigger).

To rate the audio recordings, participants were asked to listen to recordings of prompts and commands. In turn, participants were asked to recall what was said in the audio clip and answer questions, for example, regarding: how easy it was to recall what was said in the recording; the clarity of the speech; whether background noise, car alarms, other voices, and the like were heard. Participants were also asked (1) whether they believed that an audio recording was the first time the speaker had spoken that phrase, and/or (2) how many times (e.g., 0-10) they believed that the speaker had spoken that phrase.

Based on the audio recordings and their ratings, 333 audio-files were selected as the data to generate the predictive model. Initially, measures of features were extracted from the audio recordings. Extraction of the measures of features included: inputting the audio file recording, normalizing its loudness, downsampling the sample (e.g., to 8 kHz), converting it to a mono audio file, selecting particular cleaned audio files (e.g., filtering out participants that participate twice), and identifying measures of the features to extract from the audio files.

Extracting the measures of features was performed using a configuration file defining the features or measures thereof that were to be extracted, which included, for example: articulation space, standard deviation of pitch, mean energy, standard deviation of energy, mean envelope peaks, mean vocal effort, mean pitch, mean pitch variation, standard pitch variation, and other variations thereof.

The 333 audio clips corresponded to 192 participants. A random sample of 173 participant (90%) were selected to define the training-evaluation dataset, and the other 19 participants were reserved to test the final selected model. The training-evaluation dataset was partitioned into 10 groups following a random assignation to compare several models under 10-fold cross validation framework. There were created 100 random assignations in order to compare the variability of the results across different partitions.

Plots were created to visualize the available data and obtain insight regarding distributions, correlations, outstanding patterns, and/or possible outliers. Variables with highest univariate discriminative effect for the target variable (Sounds MissOccurred) included: mean envelope peaks, mean pitch variation, standard deviation of pitch variation, standard deviation of energy, and mean energy.

Figure 3A:
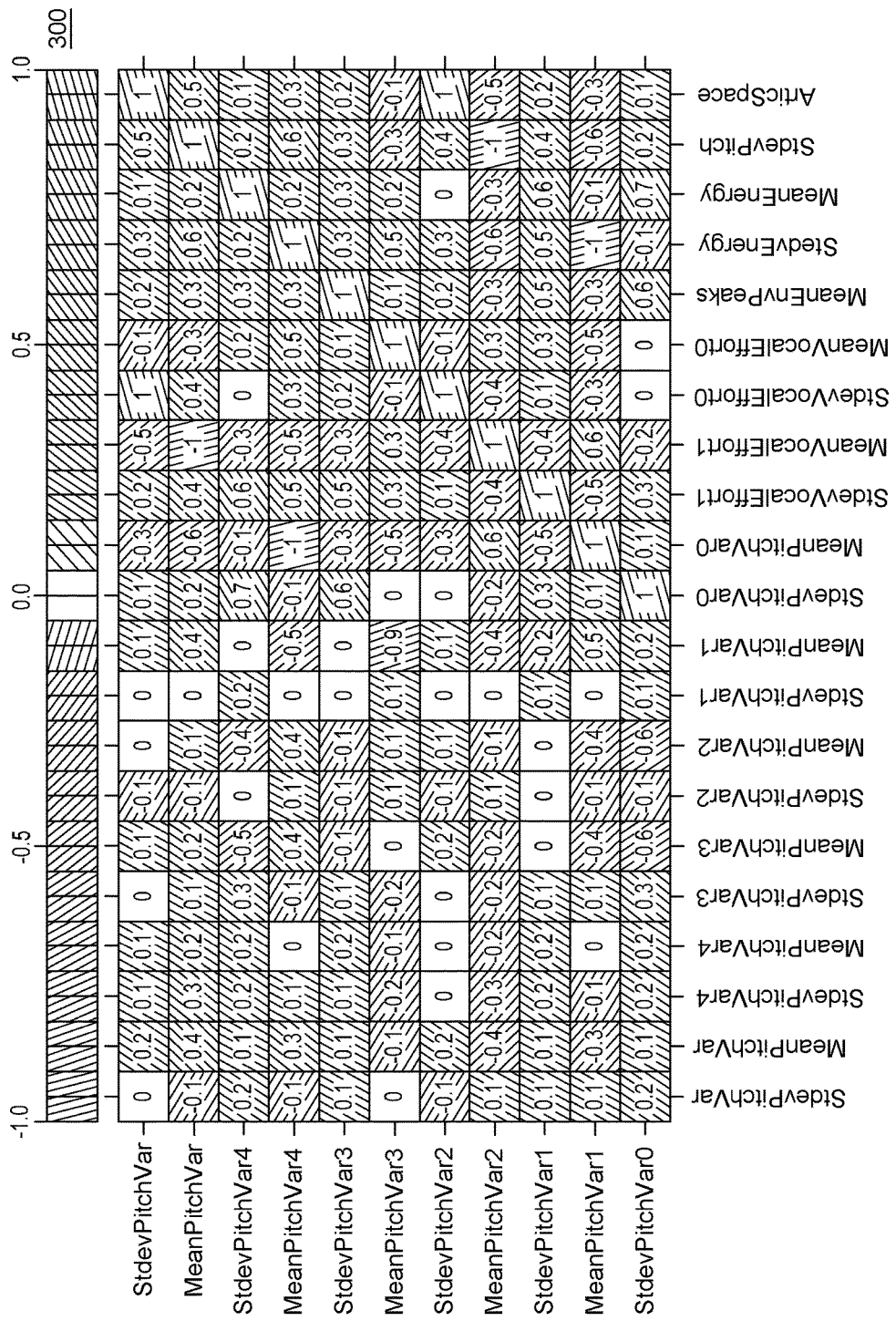
FIG. 3A illustrates a correlation structure including correlation scores between audio features used in a modeling process, according to an exemplary embodiment.
Figure 3B:
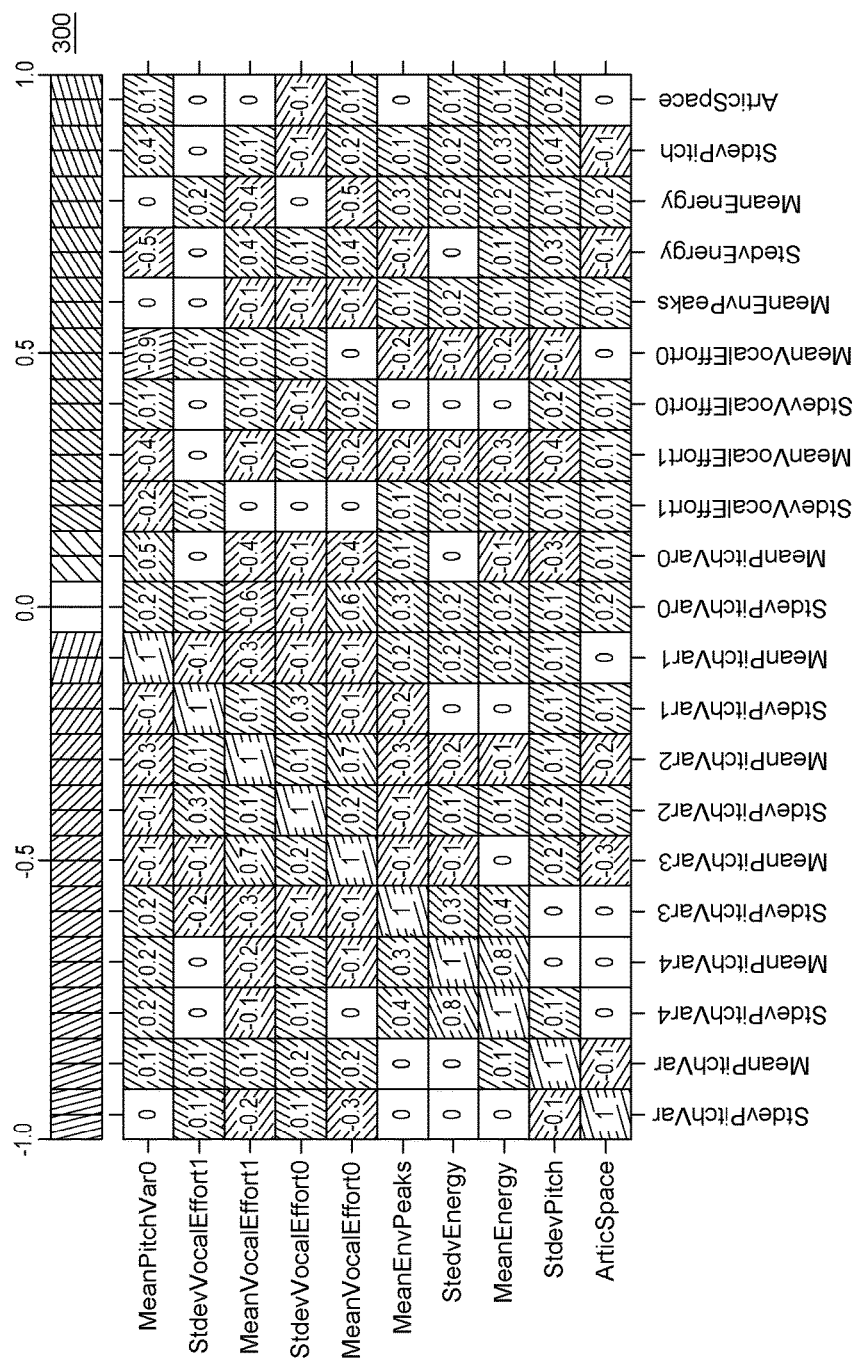
FIG. 3B illustrates a correlation structure including correlation scores between audio features used in a modeling process, according to an exemplary embodiment.
Figure 4:
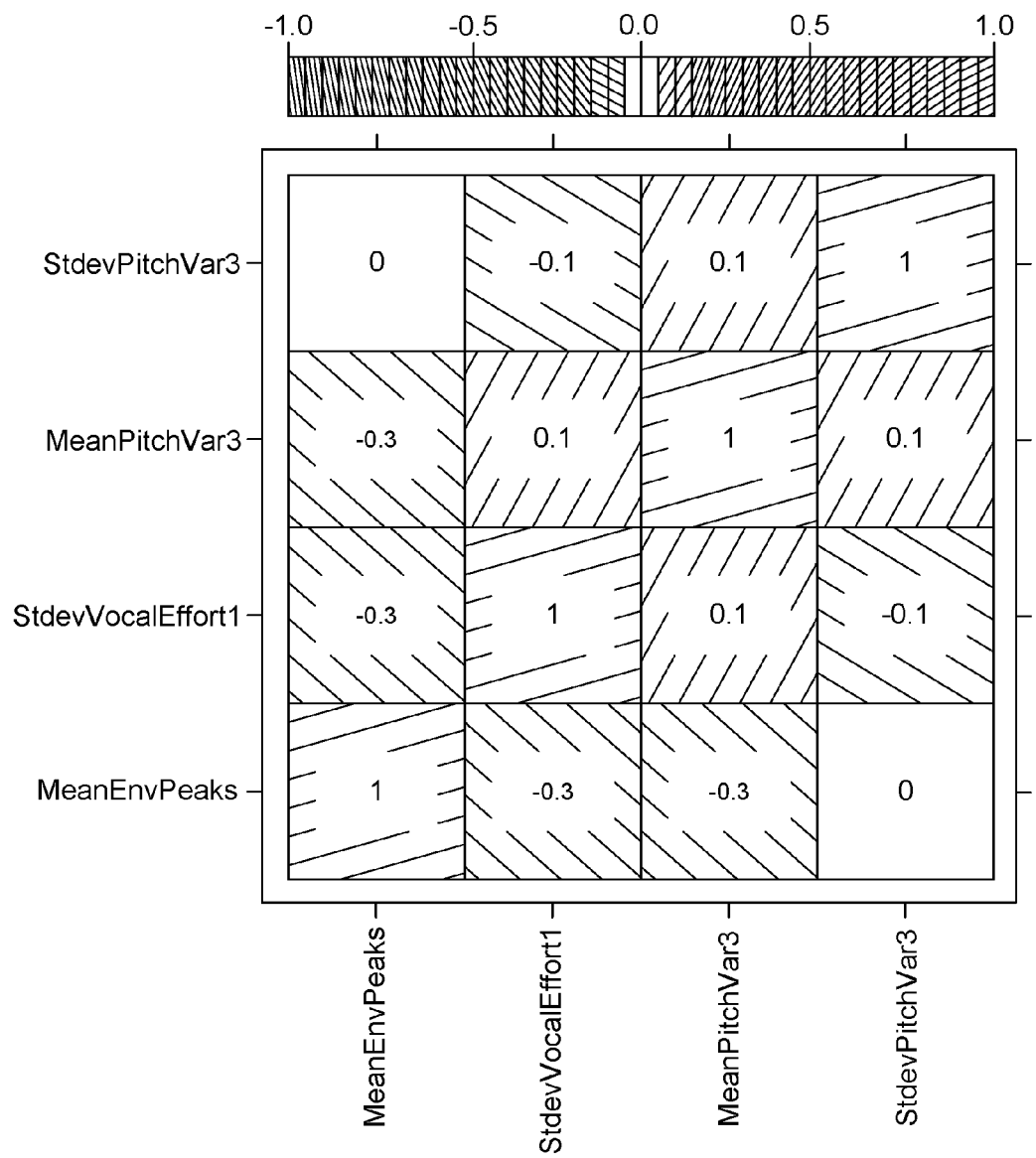
FIG. 4 illustrates a correlation structure including correlation scores between selected variables, according to an exemplary embodiment.

As shown in FIGS. 3A and 3B, the correlation between features was calculated. FIGS. 3A and 3B illustrate a correlation structure including correlation scores between exemplary measures of features used in the modeling process. In turn, candidate predictive models were measured for performance using the cross validated area under curve (AUC) value. The elastic net procedure was applied in order to select variables for the predictive model, which included: mean envelope peaks, standard deviation of vocal effort, mean pitch variation, and standard deviation of pitch variation. FIG. 4 illustrates the correlation structure including correlation scores between the selected variables.

Figure 5:
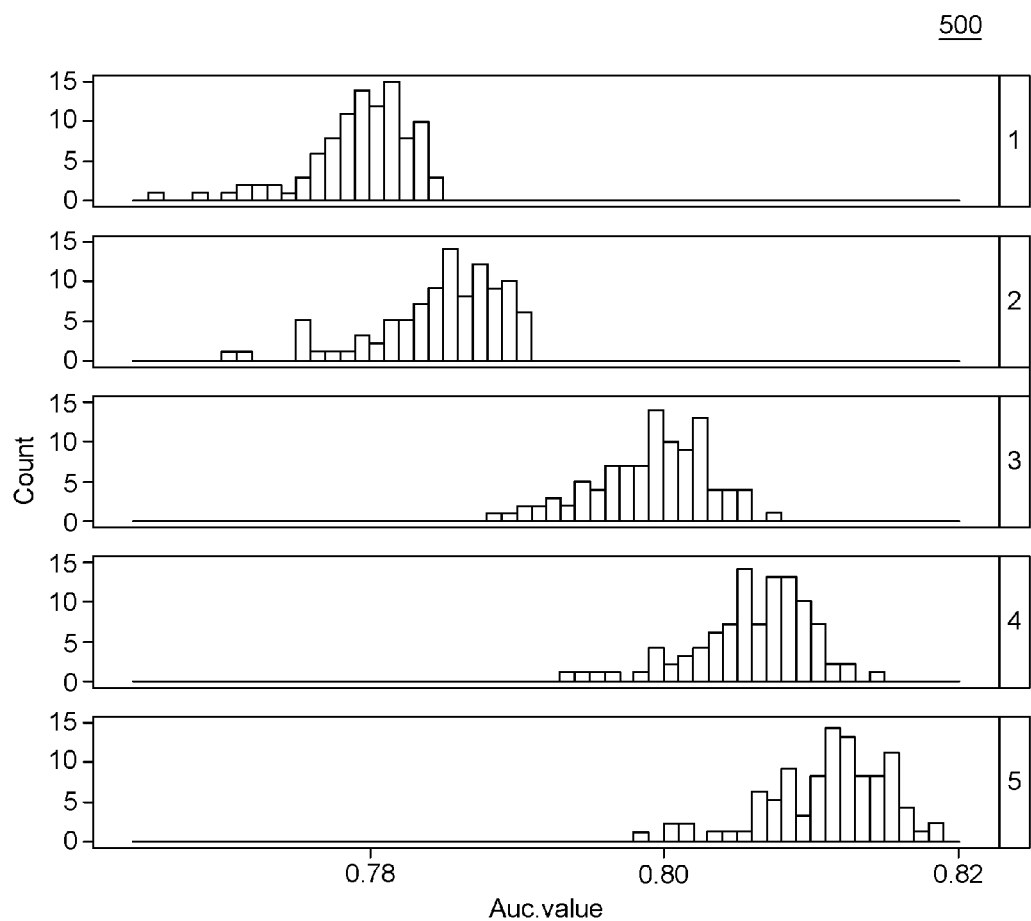
FIG. 5 illustrates a plot of area under curve distributions for four fitted generalized linear models, according to an exemplary embodiment.

Four generalized linear models (GLM) were fitted using the selected variables (e.g., mean envelope peaks, standard deviation of vocal effort, mean pitch variation, and standard deviation of pitch variation), to compare the performance with the elastic net model. The AUC values of the glm models were derived from several fold partitions to investigate the variability across different partitions. FIG. 5 illustrates a plot of AUC distributions for each of the four fitted glm models.

Based on the comparison of the models, the following model was selected: SoundsMissOccurred~mean envelope peaks+standard deviation of vocal effort+mean pitch variation+standard deviation of pitch variation. This model indicated that prediction of whether a phrase sounds like it was said after one or more mistriggers is given with most accuracy by the mean envelope peaks, standard deviation of vocal effort, mean pitch variation, and standard deviation of pitch variation. That is, the selected model indicates, for example, that after a mistrigger, a phrase is typically said more slowly, with more variations in tenser voice, and in a more monotonous than conversational voice.

Device-Based Predictive Model

Figure 6:
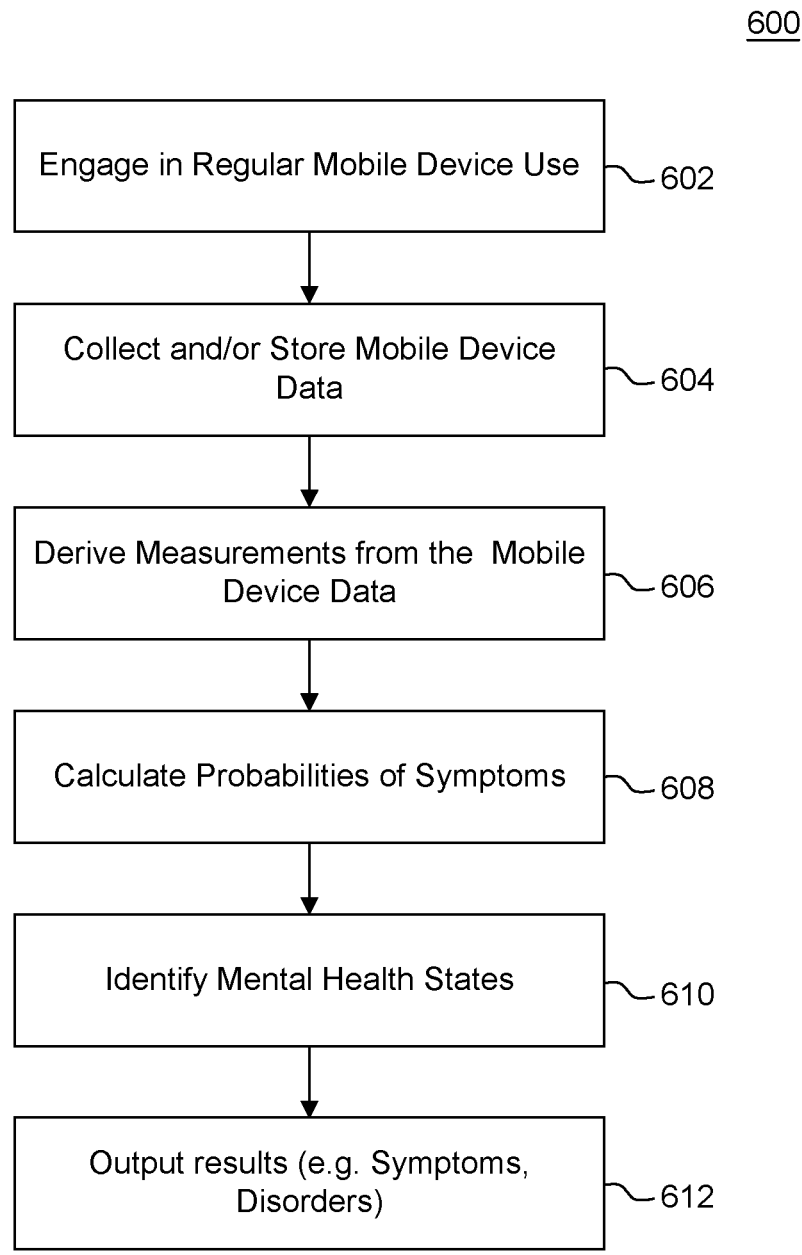
FIG. 6 is illustrates a flow chart for collecting and analyzing data from computing devices, according to an exemplary embodiment.

FIG. 6 illustrates a flow chart 600 for collecting and analyzing data from computing devices, according to an exemplary embodiment. In particular, in FIG. 6, a user (e.g., FIG. 1, user 101a) is an operator and/or owner of a mobile device (e.g., FIG. 1, mobile device 103a) having a behavioral data predictive model stored thereon for identifying human mental health states using behavioral data (e.g., passively collected from the mobile device). It should be understood that in some example embodiments, other types of predictive models such as vocal acoustic models using audio data can be used, alone or in combination with other models, to identify human mental health states, for example, using the flow illustrated in FIG. 6.

At step 602, the user engages in regular use of the mobile device over a period of time (e.g., hour, day, week). Regular use of a mobile device varies by user but includes performing actions such as placing and receiving phone calls, placing and receiving text or SMS messages, traveling and/or moving about with the mobile device, inputting audio commands and prompts, listening to music, making audio recordings, using and/or engaging with applications (e.g., social media, weather, e-mail, text, browsers, maps), and the like.

At step 604, the mobile device collects and/or stores mobile device data, which in some embodiments, includes behavioral data generated by or gathered during the regular use of the mobile device. In some example embodiments, the behavioral data is passively collected, meaning that the user does not have to take any action in order for the information to be gathered for analysis. Rather, the data is retrieved or requested directly from the sensors, memory or device, without user interaction. In some example implementations, device data (e.g., mobile device data) also includes information associated with the mobile device and/or its user (e.g., hardware data (e.g., battery life, on/off status, active/inactive status, WiFi connectivity), software data, and user information (e.g., name, age, residence, gender)).

In some example implementations, behavioral data includes sensor data and/or usage data. Sensor data refers to information collected from sensors of the mobile device. Usage data refers to information collected based on operations performed using the mobile device, such as interactions with applications, interactions with the device (e.g., turn on or off), and the like. As shown in FIG. 6, the mobile device data is collected and stored by the mobile device. However, it should be understood that the data may be alternatively and/or additionally stored by an interconnected system or device (e.g., server), as shown in further detail below with reference to FIG. 7. It should also be understood that the mobile device data may be collected continuously, at predetermined intervals, or based on particular operations performed using the mobile device (e.g., launching an application).

More specifically, sensor data includes information collected from the sensors (e.g., accelerometer, gyroscope, GPS) of or associated with the mobile device, examples of which are described in further detail above with reference to FIG. 1. In some example implementations, sensor data is continuously and passively collected from the mobile device. That is, data from the sensors is retrieved and stored without being triggered by a user action. Table 1 below illustrates exemplary sensor data, collected from a GPS sensor of a mobile device.

TABLE 1

| Device ID | GPS_Latitude | GPS_Longitude | GPS_Speed | Current Date | Current Time |
|---|---|---|---|---|---|
| 11487 | 33.69277 | −111.993959 | 5.31794917 | Sep. 26, 2014 | 11:52 |
| 11487 | 33.692752 | −111.993965 | 6.24787267 | Sep. 26, 2014 | 11:53 |
| 11487 | 33.692723 | −111.993929 | 7.78643297 | Sep. 26, 2014 | 11:58 |

Usage data includes information collected from the mobile device (e.g., memory, processor, screen, inputs). In some example implementations, usage data is collected based on user actions or actions occurring on the mobile device. For example, usage data is collected in response to a user launching an application, interacting with an application, placing a call using the mobile device, or the mobile device receiving a call. A call log entry is generated in association with the incoming and/or outgoing call and, in some instances, stored in a call log. A call log entry may include a number from which the call was received and/or to which it was placed, the date and/or time the call was received and/or placed, whether the call was answered, the duration of the call, and the like. Table 2 below illustrates an exemplary call log storing data associated with incoming and outgoing calls to a mobile device.

TABLE 2

| Number Making Call | Number Receiving Call | Start Date | Start Time | Duration |
|---|---|---|---|---|
| 6179999989 | 2158888989 | Mar. 12, 2015 | 20:40 | 01:12 |
| 9148888989 | 6179999989 | Mar. 12, 2015 | 21:22 | 04:47 |
| 6179999989 | 7188888989 | Mar. 12, 2015 | 21:30 | 00:02 |
| 6179999989 | 3108888989 | Mar. 12, 2015 | 22:15 | 23:57 |

Similarly, other uses of the mobile device cause corresponding usage data to be generated. For example, sending a message causes a message log entry to be created and, in some instances, stored in a message log. Moreover, traveling or moving from one location to another while carrying the mobile device may cause data to be generated identifying the phones position at a given time. It should be understood that other data generated by or associated with the mobile device may be used for identifying human mental health states.

In some example implementations, the collected behavioral data is referred to as "raw features," which may be grouped and/or associated based on the action or type of action to which they relate. For example, raw call features refer to behavioral data associated with one or more calls, including the time a call is originated or placed, the number on the other line, the duration of the call, and the like. Raw travel features, for example, include the time when a position of the phone is captured, the GPS latitude and longitude at the time, and the location accuracy (e.g., the standard deviation of the measurement).

In some example embodiments, raw features are used to derive other features such as SMS derived features and travel derived features. SMS derived features include, for example, elapsed, which refers to the time between two SMSs to a given message. Travel derived features include, for example, distance, distance variance, and time elapsed. Distance includes the distance (e.g., in meters) between two sample points. Distance variance refers to the variance of the distance computation. Time elapsed refers to the time elapsed between two sample points.

In turn, at step 606, the collected and stored mobile device data (or features) is used to derive measurements of that data. The derived measurements of the data may be referred to as "predictors," for example, when used in the context of creating a predictive model. In some example embodiments, the measurements of the data are grouped by related actions (e.g., call, SMS, travel) and/or periodically (e.g., weekly, monthly). In some example implementations, measurements of data grouped by action and period include call weekly features (e.g., call.number.count, call.out.mean), SMS weekly features, and travel weekly features. In other words, the collected mobile device data and/or raw features are used to derive measurements including, for example:
  1) Call weekly features—features related to calls made from or received by a computing device during a one week time period.

a. call.number.count: count of the phone number in calls
b. call.out.sum: count of calls originated
c. call.in.sum: count of calls received
d. call.missed.sum: count of calls missed
e. call.duration.sum: total duration of calls
f. call.out.mean: fraction of all calls that were originated
g. call.in.mean: fraction of all calls that were received
h. call.missed.mean: fraction of all calls that were missed
i. call.duration.mean: mean duration of all calls 2) SMS weekly features—features related to SMS messages sent from or received by a computing device during a one week period.
   a. sms.address.count: count of phone address in SMS
   b. sms.out.sum: count of SMS originated
   c. sms.in.sum: count of SMS received
   d. sms.elapsed.sum: total elapsed between SMS
   e. sms.out.mean: fraction of all SMS that were originated
   f. sms.in.mean: fraction of all SMS that were received
   g. sms.elapsed.mean: mean elapsed time between SMSs 3) Travel weekly features—features related to traveling with a computing device during a one week period.
   a. travel.distance.sum: total distance traveled
   b. travel.elapsed.sum: total time elapsed during travel
   c. travel.variance.sum: variance of total distance traveled Moreover, deriving measurements of the collected data (e.g., raw features) may include grouping and/or clustering the data. In some example embodiments, travel features are clustered to identify, for instance, traveling along roads. Clustering may be limited by number of points (e.g., locations) and distance between points (e.g., 20 to 100 meters). In some example embodiments, travel cluster features include:

1) cluster.size: number of locations in a cluster
2) cluster.fraction: ratio of a cluster's size to the total number of locations in a week
3) cluster.transitions: number of entrances into and exits from a cluster At step 608, the measurements derived at step 606 are used to calculate the probability of the existence of symptoms of human attributes and mental health states associated with the user of the mobile device, with which the data and/or features are associated. More specifically, at least a portion of the measurements derived at step 606 are input into one or more predictive models. In some example implementations, the predictive models are stored on the mobile device corresponding to the user, a server, a remote centralized third-party system, or a scalable cloud environment. The predictive models include, for example, a behavioral data model and a vocal acoustic data model, both of which are used to calculate the probability of symptoms and, in turn, predict, diagnose, or identify human attributes or human mental health states based on measurements derived from mobile device data (e.g., features). For example, the behavioral data model uses, as inputs, measurements derived from behavioral data (e.g., sensor data, usage data) collected from the mobile device. In some example embodiments, mobile device data such as audio recordings, audio inputs, and the like are input into the vocal acoustic data model to, among other things, identify symptoms of the user.

More specifically, at step 608, a portion of the measurements derived at step 606 (e.g., call.out.sum, travel.distance-.sum, sms.address.count) are input into the behavioral data model stored on the mobile device. The behavioral data model is in turn executed by the mobile device to identify symptoms of the user. In particular, the behavioral data model calculates and outputs probability scores identifying the likelihood that the user of the mobile device has a symptom (e.g., symptom associated with a disorder), based on the input behavioral data.

In one example embodiment, inputting the derived measurements of call.out.sum, sms.address.count, and travel.distance.sum into the behavioral data model causes it to be executed and, in turn, output the probability of the likelihood of the user of the mobile device having symptoms such as fatigue (e.g., fatigue or loss of energy), insomnia, diminished interest, and the like. Table 3 below includes examples of symptoms and disorders with which they are associated. It should be understood that these are merely exemplary, and that predictive models (e.g., behavioral data model, vocal acoustic data model) can be used to predict other symptoms, disorders, human attributes and/or mental health states, such as those described in the Diagnostic and Statistical Manual of Mental Disorders (e.g., Fourth Edition, 2000).

TABLE 3

| Symptom | Description | Disorder |
| --- | --- | --- |
| Depression | Depressed mood most of the day. | Depression |
| Interest | Diminished interest or pleasure in all or most activities. | Depression |
| Sleep | Insomnia or sleeping too much. | Depression |
| Fatigue | Fatigue or loss of energy. | Depression |
| Concentration | Diminished ability to think or concentrate, or indecisiveness. | Depression |
| Isolation | Avoid thoughts, feelings or conversations. | Depression |
| Interest | Avoid activities, places, people. | Depression |
| Sleep | Difficulty falling or staying asleep. | PTSD |
| Anger | Irritability or outbursts of anger. | PTSD |

In turn, at step 610, the calculated probabilities of symptoms being present in the user are used to determine, identify and or diagnose mental health states and/or disorders in the user. That is, the identified symptoms and their corresponding probabilities are linked with corresponding disorders and the user is diagnosed accordingly.

At step 612, the resulting diagnosis and/or calculations of probabilities of symptoms of the user are stored and/or output by the mobile device. That is, in some example embodiments, the mobile device stores the results of the analysis (e.g., diagnosis and/or symptoms) in its memory or in an associated memory. In some example embodiments, the diagnosis and/or calculations are output (e.g., transmitted) for further processing, for example, to insurance carriers, clinicians, and the like.

It should be understood that the analysis of the mobile device data and the diagnosis of disorders or mental health states is performed passively (e.g., without requiring any triggers from the user of the mobile device in order to collect and/or analyze the data). In other words, the analysis and diagnosis are performed passively and automatically by collecting data (e.g., mobile device data) routinely generated and/or stored by the mobile device (e.g., data existing notwithstanding the predictive models).

In some example implementations, the predictive models include a vocal acoustic data model used to analyze audio data in order to identify human mental health states. In certain example implementations, the configuration file is used to configure setup for a signal processing and/or compute engine. The vocal acoustic data model may be defined in and/or by a configuration file. The vocal acoustic data model uses measures of audio features (e.g., envelope peaks, pitch variation, vocal effort), for example, to identify human emotional states, intentions, behaviors, and the like. It should be understood that other various audio features may be used with the predictive model, including features that describe speaking style and/or additional prosodic features. Prosodic features can indicate emotional state of the speaker, the form of the utterance (e.g., statement, question, command), the presence of irony or sarcasm, emphasis, contrast, focus and the like.

Prior to execution of analysis with the model, audio data (e.g., audio diaries) are entered and/or input into a computing device. The computing device receives the audio input, extracts raw audio features and extracts computes measurements of these features from it. In certain example implementations, these features are used as predictors. In some example implementations, extracting measurements of features from an audio input includes one or more of: (1) normalizing loudness (2) downsampling the audio, (3) converting the sample to mono-audio file, and (4) referencing a configuration file to identify features to extract.

Normalizing loudness is a process of normalization of the measure of loudness of the audio input, in which the average amplitude is set (e.g., reduced) to a target level. The average amplitude is the measurement of average power (e.g., root mean square value) of the audio input.

Downsampling an audio file is a process of reducing the sampling rate of a signal from an existing rate to, for example, 8 kHz. Downsampling or downsizing causes the data rate or size of the data of the audio file to be reduced in a proportion similar or equal to the amount of sampling rate reduction.

Converting the sample to mono (or monophonic) refers to the process of mixing multiple audio signals (e.g., stereo or stereophonic) into a single channel, in order to have a single audio stream for processing.

Finally, referencing a configuration file includes identifying the features for which measures are to be extracted from the cleaned audio files. In some example embodiments, a configuration file including a predictive model (e.g., vocal acoustic data model) definition is used to determine the measures of features to be extracted from the audio files. Examples of the measures of features that are extracted from the audio file to input into the voice acoustic data model include:

a. Pitch Variation (e.g. StdevPitchVar)—is an algorithm used to assess adjacent magnitude: fast Fourier transform (FFT) spectra. Spectra are dilated or contracted and compared by computation of dot-products. The dilation and contraction is done systematically in a realistic range of possible fundamental frequency variations (e.g., within a certain duration of time) on the octave scale. The output of this is the fundamental frequency variation (FFV) spectrum. If a speaker's pitch is not varying over adjacent frames, the FFV presents a strong central peak. A falling pitch results in an FFV with a peak skewed to the left, and a rising pitch causes a peak to the right of the FFV spectrum. To compress this spectrum, five trapezoidal filters are applied to the FFV spectrum resulting in five features. In some example implementations, settings, including ITT frame durations and the dilation/contraction range, are modified to better suit realistic pitch movements, and the space between compared FFT frames is increased in order to better allow time for pitch changes, Additionally, in some example implementations, the feature measure data is dimensionally reduced to a single feature by linear combination, using the weight coefficients derived using Principal Component Analysis (PCA) of previously obtained speech data with different degrees of pitch variation. That is, the pitch variation feature provides low values for monotonous, non-varying pitch and high values for highly dynamically varying pitch. In some examples, the single dimensionally-reduced pitch variation feature measures are used, whereas in other examples, five non-dimensionally reduced measures of features are used. Examples of pitch variation calculations may be found in Kornel Laskowski et al., *The fundamental frequency variation spectrum*, FONETIK (2008), the contents of which are incorporated herein by reference in their entirety.

b. Vocal Effort (e.g., StdevVocalEffort0, MeanVocalEffort1)—is a measure of a feature designed to discriminate soft, breathy voices from loud, tense ones. Vocal effort is computed via a linear combination of previously published features. A set of spectral gradients are computed from the FFT magnitude spectrum. Examples of algorithms for calculating spectral gradients may be found in Lugger, Yang & Wokurek (2006), the contents of which are incorporated herein by reference in their entirety. In one example implementation, to determine the frequencies in the magnitude spectrum to compute the gradients, peak-picking in fixed frequency ranges is used. In other example implementations, fundamental frequency (f0) and formant tracking are used to determine the frequencies in the magnitude spectrum to compute the gradients. Three spectral gradients are used to compute the coal effort feature. In one example, the Cepstral Peak Prominence feature may be used. The Cepstral Peak Prominence feature is described in further detail in James Hillenbrand and Robert A. Houde, *Acoustic Correlates of Breathy Vocal Quality: Dysphonic Voices and Continuous Speech*, Journal of Speech and Hearing Research, (1196), the contents of which are incorporated herein by reference in their entirety. The magnitude Cepstrum, which is essentially the log power ITT spectrum of a log power FFT spectrum, may be used. A peak corresponding to the voice f0 appears in the cepstrum for voiced speech and in may be used in the algorithm to normalize to the magnitude of that same frequency (e.g cepstral frequency) on a regression line fit to the magnitude cepstrum. In some example implementations, the peak magnitude is normalized to the average cepstral magnitude rather than having to fit a regression line. The four features are linearly combined in a regression model, the weight coefficients for which were derived using speech data with different acted levels of vocal effort.

In some example implementations, the extracted audio features are summarized using descriptive statistics (e.g., mean, standard deviation). The processed features are then used as predictors. In certain example implementations, the predictors are used as inputs to a voice acoustic data model, which can, in turn, provide inference based on the speaking behavior present in the audio. In some implementations in which a computing device is not equipped with audio analysis functionality, or such analysis is chosen to be performed remotely, the measures of the features are transmitted to a server for the analysis. As a result of the analysis of the audio features, the vocal acoustic data model provides probabilities of the presence of symptoms and/or human mental health states (e.g., disorders) based on those probabilities. It should be understood that the measures of audio features may be used together with the behavioral data model described herein to identify mental health states.

Remote Predictive Model

Figure 7:
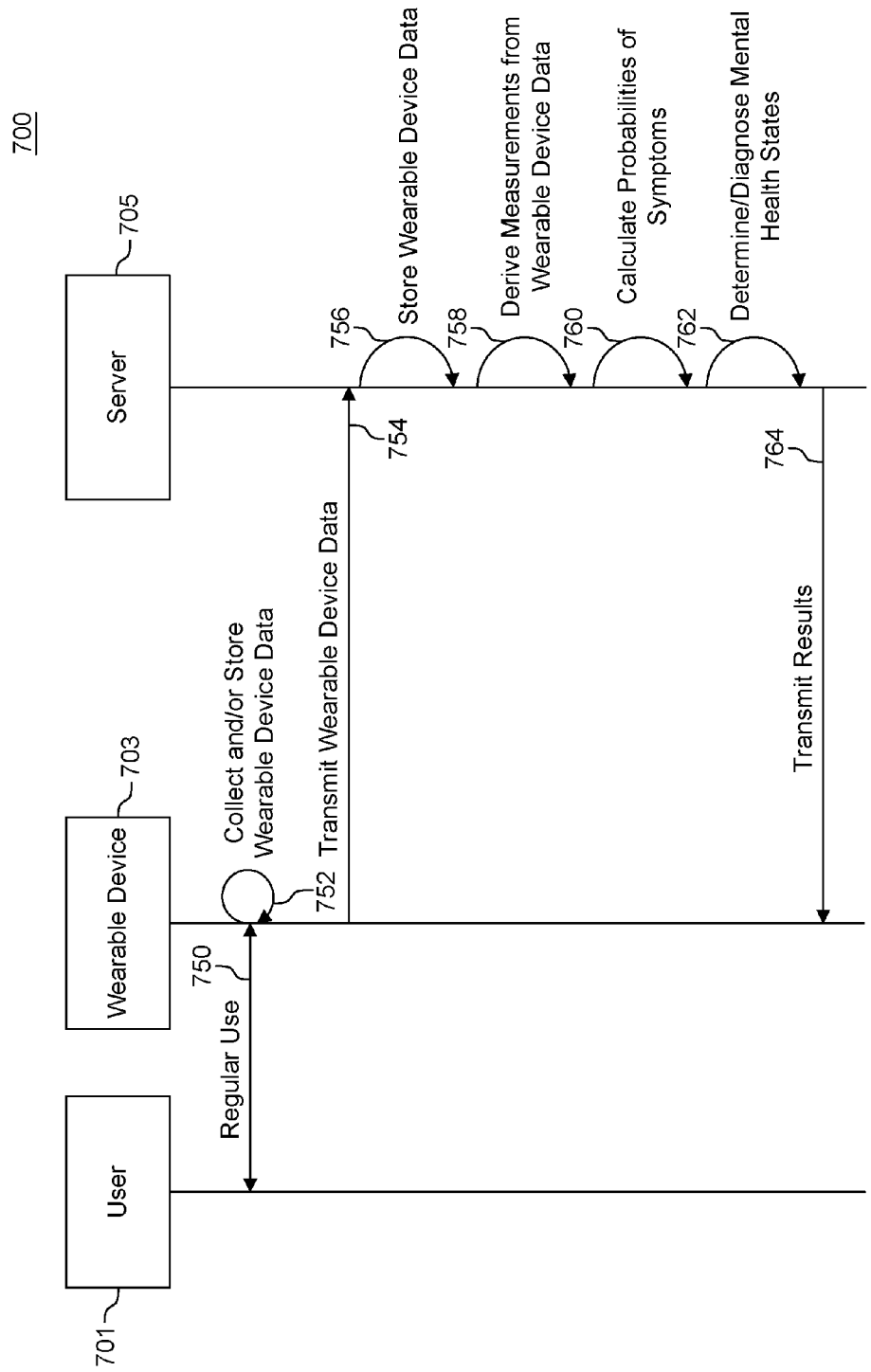
FIG. 7 illustrates a sequence diagram for collecting and analyzing behavioral data from computing devices, according to an exemplary embodiment.

FIG. 7 illustrates a sequence diagram 700 for collecting and analyzing behavioral data from computing devices, according to an exemplary embodiment. In particular, in FIG. 7, a user 701 (e.g., FIG. 1, user 101*a*) is an operator and/or owner of a wearable device 703 (e.g., FIG. 1, wearable device 103*n*) that is communicatively coupled (e.g., over a network) with a server 705 (e.g., FIG. 1, server 107) on which a behavioral data model is stored for identifying human mental health states based on behavioral data. It should be understood that in some example embodiments, other types of predictive models such as vocal acoustic models using audio data can be used, alone or in combination with other models, to identify human mental health states, for example, using the sequence illustrated in FIG. 7.

At step 750, the user engages in regular use of the wearable device 703 over a period of time (e.g., hour, day, week). As described in further detail above with reference to FIG. 6, regular use of the wearable device varies by user but includes performing actions such as placing calls, receiving calls, sending messages (e.g., SMS), receiving messages, traveling and/or moving about with the wearable device, using and/or engaging with applications, and the like.

At step 752, the wearable device 703 collect and/or stores wearable device data, which may include behavioral data generated by or gathered during the regular use of the wearable device. In some example implementations, behavioral data includes sensor data (e.g., information collected from sensors of the wearable device) and/or usage data (e.g., information collected based on operations performed using the wearable device). Sensor data and usage data are described in further detail above with reference to FIG. 6. It should be understood that the wearable device data may be collected continuously, at predetermined intervals, or based on (e.g., in response to) particular operations performed using the wearable device 703 (e.g., launching an application, interacting with a social media application). In some example implementations, the behavioral data is referred to as "raw features," such as raw call features or raw travel features.

At step 754, the collected (and/or stored) wearable device data (e.g., behavioral data, raw features) are transmitted by the wearable device 703 to the server 705. The server 705 may be a hosted centralized onsite server or may be part of a scalable cloud environment with which multiple computing devices are interconnected. In some example implementations, the server 705 stores the received wearable device data at step 756.

Using at least a portion of the received wearable device data, the server 705 derives measurements from that data at step 758. In some example implementations, the derived measurements include action-grouped features (e.g., call features, SMS features), periodic features (e.g., call weekly features, travel weekly features), and/or clustered features. Examples of derived measurements of the wearable device data (e.g., behavioral data, raw features) are described above in further detail with reference to FIG. 6.

At step 760, the measurements derived at step 758 are used to calculate the probability of the existence of symptoms in the user 701 (the user of the wearable device 703). That is, at least a portion of the derived measurements are input into the predictive model stored in the server 705. In some example implementations, the predictive model is a behavioral data model used to calculate the probability symptoms present in the user, based on the wearable device data collected from wearable device 703. In turn, the behavioral data model is executed to identify the symptoms of the user, more specifically probability scores identifying the likelihood that the user has a symptom. Exemplary symptoms are described above in more detail with reference to FIG. 6 and Table 3.

In turn, at step 762, the probabilities calculated at step 760 are used to determine or diagnose mental health states and/or disorders in the user. The resulting diagnosis is transmitted to the wearable device 703 at step 764. The wearable device, in turn, can store and/or transmit the received results.

Updating and/or Combining Predictive Models

Figure 8:
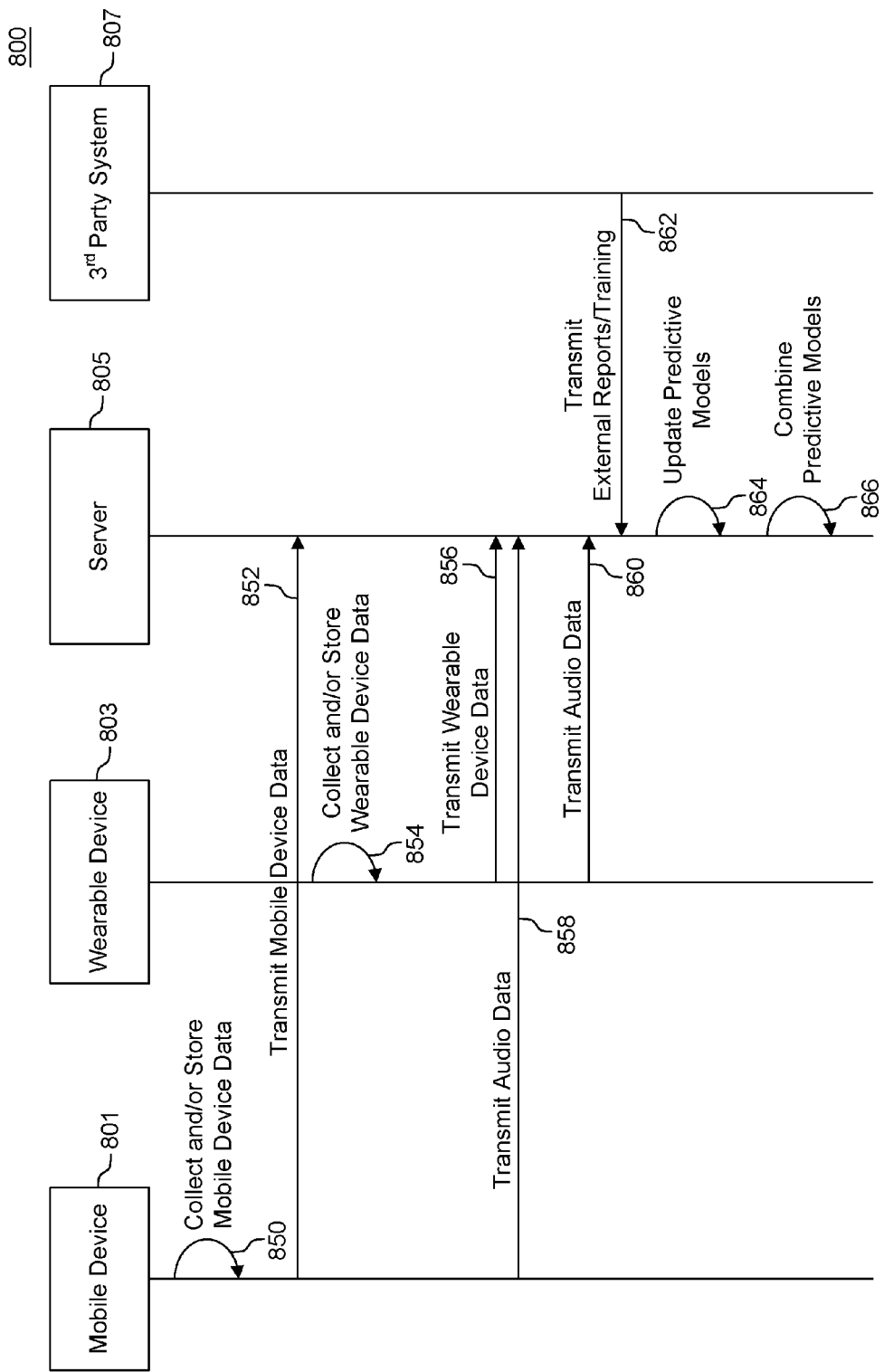
FIG. 8 illustrates a sequence diagram for updating and combining predictive models, according to an exemplary embodiment.

FIG. 8 illustrates a sequence diagram 800 for updating and combining predictive models, according to an exemplary embodiment. In particular, in FIG. 8, the predictive models are stored in a server 805. However, it should be understood that predictive models may be stored on the server or computing devices (e.g., mobile device 801, wearable device 803). In some example implementations, the predictive models include behavioral data models and vocal acoustic data models, which are described above in more detail with reference to FIGS. 1, 6-7.

At step 850, the mobile device 801 (e.g., FIG. 1, mobile device 103*a*) collects and/or stores mobile device data generated during regular use of the mobile device. The mobile device data may include behavioral data such as sensor data and/or usage data. The collected mobile device data (or a portion thereof) is transmitted to the server 805 at step 852. Similarly, at step 854, the wearable device 803 collects and/or stores wearable device data (e.g., behavioral data) generated during regular use of the wearable device. The collected wearable device data (or a portion thereof) is transmitted to the server 805 at step 856. Mobile device data and wearable device data, and the collection, storage and transmission thereof is described above in further detail with reference to FIGS. 1, 6-7.

At step 858 and 860, the mobile device 801 and wearable device 803, respectively, transmit audio data to the server 805. In some example implementations, the audio data is one or more of an audio recording (e.g., audio diary) stored on the memory of the corresponding device, or an input or command. The audio data may be transmitted in its original form or as extracted measurements of features of the original audio signal. Extracting measurements of features and deriving measurements from the features of audio data is described above in further detail with reference to FIG. 6, and in concurrently filed U.S. patent application titled "Systems and Methods for Identifying Human Emotions Based on Analyses of Audio Inputs," naming Joshua Feast, Ali Azarbayejani and Skyler Place as inventors, the contents of which are incorporated herein by reference in their entirety.

At step 862, external reports and/or training are transmitted by a third party system 807 to the server 805. External reports and/or training may include clinical ratings of behavior and/or symptoms (e.g., an expert determination by a clinician based on the results of a structured interview (e.g., a positive value may indicate that an expert determined a symptom was present in a patient, and a null value may indicate that a symptom was not present in the patient) or self-reported information (e.g., through standardized survey metrics for depression such as the PHQ-9, PHQ-2, and the like). The server 805, using at least a portion of the received mobile device data, wearable device data, audio data, and external reports and/or training, updates the predictive models at step 864. Updating the predictive models includes training (or re-training) the models using the newly-received data, for example, to obtain more accurate probabilities of symptoms being present, finding new correlations among derived measurements of features, symptoms and disorders, and the like. In certain example embodiments, clinical ratings provide a foundational basis for finding correlations in the received data. In some example embodiments, updating predictive models includes training the models using all available data, including the newly-received data. Training of vocal acoustic (e.g., audio) data models is described in further detail below and in concurrently filed U.S. patent application titled "Systems and Methods for Identifying Human Emotions Based on Analyses of Audio Inputs," naming Joshua Feast, Ali Azarbayejani and Skyler Place as inventors, the contents of which are incorporated herein by reference in their entirety. Training of predictive models (e.g., behavioral data model) is described in further detail below with reference to FIGS. 9-12.

At step 866, the server 805 combines the behavioral data model and the vocal acoustic data model (or their functionality) into a single predictive model. That is, the behavioral data model described is combined with a vocal acoustic data (e.g., audio) model to identify mental health states using behavioral data (e.g., sensor data, usage data) and audio data (e.g., audio diary entries). In this way, multiple data sources (e.g., sensor data, voice data) can be combined to create a stronger representation and a more accurate analysis of human behaviors and mental health states. In some example embodiments, a first predictive model is directed to evaluating a probability of a first symptom (e.g., fatigue, insomnia, diminished interest, and the like), behavior, disorder, human attribute or mental health state being present. In certain example embodiments, if the probability exceeds a threshold value, a positive (e.g., a binary one) determination is made, and if it does not, a negative (e.g., a binary zero) determination is made. In some example embodiments, determination of the presence of a behavioral or mental health state is based on the probabilities and/or binary determinations of multiple individual predictive models. For example, a patient is determined to be positive for a behavioral or mental health state (e.g., depression) if a threshold number of a set of individual predictive models (e.g., fatigue, insomnia, diminished interest, and the like) result in a positive (e.g., binary one) determination, and the patient is determined to be negative for the behavioral or mental health state if not.

Modeling Process

A behavioral data model was designed to identify human mental health states based on behavioral data. Initially, data was collected from 110 participants having a history of depression and PTSD symptoms. Two types of data were collected for each participant: behavioral data and assessments of mental health. The behavioral data included information gathered from the participants' mobile devices (e.g., cell phone), including cell phone application information. The behavioral data included both passively gathered behavioral data as well as user-input behavioral data (e.g., audio diaries). The assessment of mental health data included assessments generated using validated and accepted clinical psychological measures including structured interviews and self-report surveys.

Data collection was performed over a three month period and contained three main components (e.g., phases): baseline assessment, smart phone monitoring, and follow-up assessments. The baseline assessment consisted of structured interviews with clinicians and battery of survey measures. The interviews included Structured Clinical Interview for Disorders (SCID) PTSD Module and Major Depressive Disorder Module of the Mini International Neuropsychitaric Interview (MINI). The battery of survey measures included historical and demographic information, a PTSD checklist measuring PTSD symptoms, TBI questionnaire, World Health Organization Quality of Life (WHOQL), World Health Organization Disability Assessment Schedule II (WHODAS), Inventory of Psychosocial Functioning (IPF), Alcohol Use Disorders Identification Test (AUDIT), severity of somatic, anxiety and depression symptoms, and DRRI (combat experiences and post battle experiences).

For the smart phone (e.g., mobile device) monitoring, a smart phone (e.g., mobile device) was provided to the participants to be used as their primary device during the monitoring phase. The participants used the device for calls, texts, web browsing and other smartphone applications. A behavioral data analysis application was installed on the device to collect and manage behavioral data. In particular, two types of data were collected: passive data and user generated responses. The passive data included regular usage information grouped as follows:

1) Activity—data gathered regarding the physical handling of the device.
2) Social—data gathered from how users interact with others through the device (e.g., calls, SMS).
3) Location—data gathered about the physical location of the device.
4) Device Interaction—sensor data indicating, for example, when the phone is being used (e.g., phone screen on, off, activated, deactivated).
5) Device Information—data gathered from the status of the actual cell phone (e.g., battery status, on and off state).

The user-generated responses included answers to survey questions and diary entries. Participants were prompted for survey and audio diaries. Audio diaries were designed to be 30 second "voicemail" style diary entries about the participant's day and mood.

Lastly, the follow-up assessment included structured interviews with clinicians and battery of survey measures, along the lines of the baseline assessment.

Figure 9:
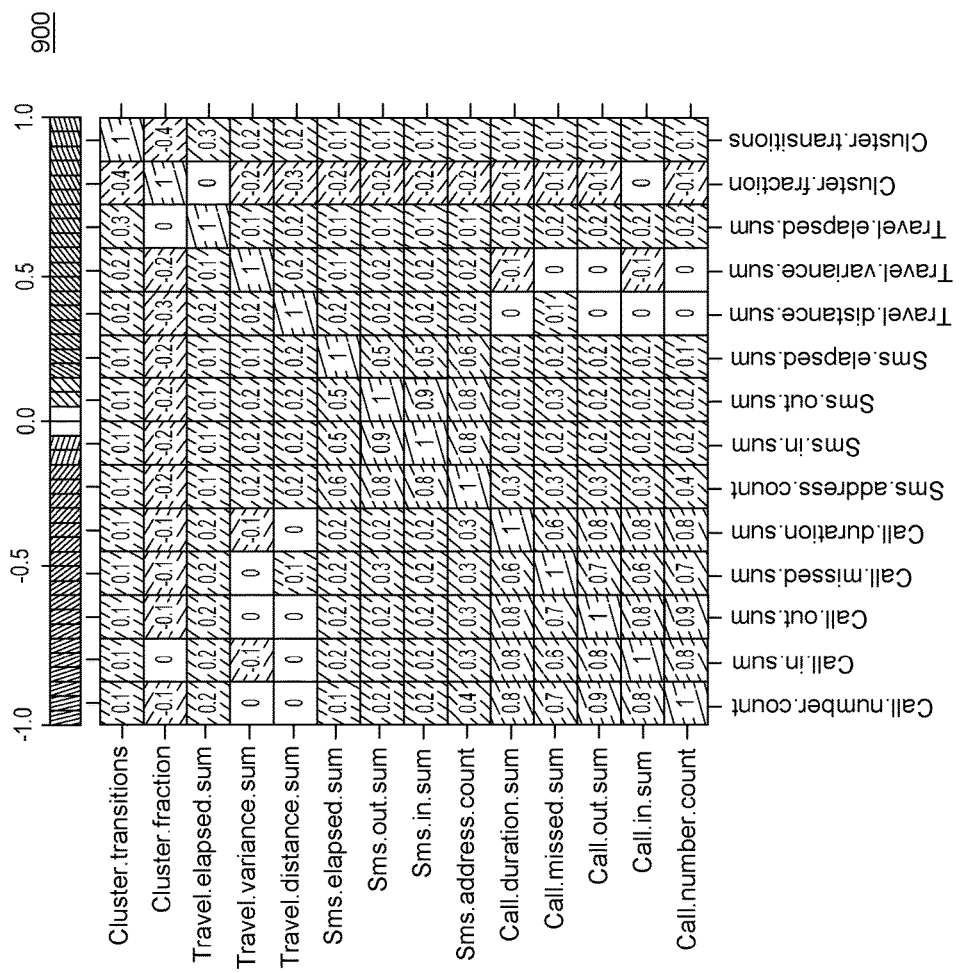
FIG. 9 illustrates a correlation structure of weekly predictors considered during modeling of a predictive model, according to an exemplary embodiment.

In turn, behavioral data derived from the smart phone (e.g., mobile device) monitoring phase was organized to define a set of features which could serve as potential predictors of PTSD and depression symptoms. Raw mobile features captured in probes included:

1) Call features related to calls made to or from the device
   i) time: when the call was originated or received
   ii) number: the number of the other phone
   iii) out: a call was originated
   iv) in: an incoming call was answered
   v) missed: an incoming call was not answered
   vi) duration: the time between a call being started and ended
2) SMS features related to messages sent to or from the phone
   i) time: when the SMS was sent or received
   ii) address: the SMS address of the other phone
   iii) out: an SMS was originated
   iv) in: an SMS was received
3) Travel features related to the phone's position
   i) time: when the position was sampled
   ii) location: the GPS latitude and longitude
   iii) location accuracy: the standard deviation of the measurement The raw features were then used to derive the following features:
1) SMS derived features
   i) elapsed: the time between two SMSs to a given address
2) Travel derived features
   i) distance: the distance (meters) between two sample points
   ii) distance variance: the variance of the distance computation
   iii) time elapsed: the time elapsed between two sample points These features were then used to derive periodic features by week before the participants completed the study:
1) Call weekly features—features related to calls made from or received by a computing device during a one week time period.
   i) call.number.count: count of the phone number in calls
   ii) call.out.sum: count of calls originated
   iii) call.in.sum: count of calls received
   iv) call.missed.sum: count of calls missed
   v) call.duration.sum: total duration of calls
   vi) call.out.mean: fraction of all calls that were originated
   vii) call.in.mean: fraction of all calls that were received
   viii) call.missed.mean: fraction of all calls that were missed
   ix) call.duration.mean: mean duration of all calls
2) SMS weekly features—features related to SMS messages sent from or received by a computing device during a one week period.
   i) sms.address.count: count of phone address in SMS
   ii) sms.out.sum: count of SMS originated
   iii) sms.in.sum: count of SMS received
   iv) sms.elapsed.sum: total elapsed between SMS
   v) sms.out.mean: fraction of all SMS that were originated
   vi) sms.in.mean: fraction of all SMS that were received
   vii) sms.elapsed.mean: mean elapsed time between SMSs
3) Travel weekly features—features related to traveling with a computing device during a one week period.
   i) travel.distance.sum: total distance traveled
   ii) travel.elapsed.sum: total time elapsed during travel
   iii) travel.variance.sum: variance of total distance traveled In addition, the travel locations were grouped into clusters to derive features. Hierarchical clustering by complete linkage was used to identify travel along roads. Clusters were only considered if they had at least 3 points, and were between 20 and 100 meters in diameter.
1) cluster features include:
   i) cluster.size: number of locations in a cluster
   ii) cluster.fraction: ration of a cluster's size to the total number of locations in a week
   iii) cluster.transitions: number of entrances into and exits from a cluster FIG. 9 illustrates a correlation structure of weekly predictors considered during the modeling.

For the modeling phase, the following mobile weekly predictors (e.g., measures of behavioral data or features) were utilized:

| Predictor | Computation | Time Representation | Transformations |
|---|---|---|---|
| travel.distance.sum | Difference in meters between consecutive GPS readings | Aggregated as total per week | Log transformed |
| call.out.sum | Time in seconds the mobile device was connected to a phone | Aggregated as total per week | Log transformed |
| sms.address.count | Number of addresses to which an SMS was sent | Aggregated as total per week | Log transformed |

The following audio diary signals predictors (e.g., measures of features of audio signals) (e.g., dynamic variation (DV), sounds depressed (SD), and envelope peaks (EPDC)) were utilized:

| Predictor | Computation | Time Representation |
|---|---|---|
| DV1 | Dynamic variation, per slice | Aggregated as an average per diary entry |
| EPDC | Proxy for speaking rate, per slice | Aggregated as an average per diary |
| SD2 | Sounds depressed, per slice | Aggregated as an average per diary |
| DV1.mean | Dynamic variation per slice | Aggregated as an average per week diary entries |
| EPDC.mean | Proxy for speaking rate, per slice | Aggregated as an average per week diary entries |
| SD2.mean | Sounds depressed, per slice. | Aggregated as an average per week diary entries |
| DV1.sd | Dynamic variation, per slice | Aggregated as an average per week diary entries |
| EPDC.sd | Proxy for speaking, rate per slice | Aggregated as an average per week diary entries |
| SD2.sd | Sounds depressed, per slice | Aggregated as an average per week diary entries |

The following DSM-IV TR symptoms associated with depression and PTSD symptoms were considered as model targets:
1) Depression Symptoms:
   i) A1—depressed mood most of the day
   ii) A2—Diminished interest or pleasure in all or most activities
   iii) A4—Insomnia or sleeping too much
   iv) A6—Fatigue or loss of energy
   v) A8—Diminished ability to think or concentrate, or indecisiveness
2) PTSD Symptoms:
   i) C1—Avoid thoughts, feelings or conversations
   ii) C2—Avoid activities, places, people
   iii) C4—Diminished interest or participation in significant activities
   iv) C5—Feeling of detachment or estrangement from others
   v) D1—Difficulty falling or staying asleep
   vi) D3—Irritability or outburst of anger There were proposed 2 versions of statistical models to predict the diagnosis of DSM-IV TR symptoms associated with depression and PTSD based on the mobile predictors call.out.sum, travel.distance.sum and sms.address.count and audio signal predictors SD2, EPDC and DV2.

In one version, models were built on the foundation created by the 12-week models. Inputs to the models are single value algorithmic activity features (e.g., sum count of calls received in a week) and outputs are probabilities of positive symptoms (data range: 0 to 1). Additionally, demographic covariates were used in the testing and training of these models. Participant data was grouped by gender or age (split into two groups at age 39), or both. No other demographic data of any type was used. Model coefficients/parameters were derived by mixed-effects regression training on the data set.

In another version, models were built on the latest week of data (one week of data previous to the SCID symptom assessment). Inputs to the models are single value algorithmic activity features (e.g., sum count of calls received in a week) and outputs are probabilities of positive symptoms (data range: 0 to 1). No demographic covariates were used in the testing and training of these models.

To validate the selection of symptoms models, a list of candidate logistic models was proposed by mixing and combining the selected predictors: travel.distance.sum, call.out.sum and sms.address.count. Candidate models were compared in terms of Bayesian information criterion (BIC) and the cross validated model performance was quantified in terms of area under the receiver operator characteristics curve (AUC) values. Proposed models were selected to optimize these metrics. The performance of each selected model was quantified by averaging AUC cross validated values across 100 random 10-fold partitions of the sample.

In some example embodiments, the models included audio diary signal predictors SD2.mean, DV2.mean, EPDC.mean, SD2.sd, DV2.sd and EPDC.sd. Candidate models were compared in terms of model comparison criteria. FIG. 10 illustrates models for identifying human emotional stress based on behavioral data and/or audio diary signals, in accordance with exemplary embodiments.

Observations in the proposed models were weighted to compensate for the high observed prevalence of PTSD and depression history in the sampled participants. Weights were defined to such that the weighted sample prevalence in the sampled data would mimic the prevalence obtained from CPES population survey. There were considered two options to define the weights: (1) weights defined to mimic prevalence of 30 day diagnosis of depression or PTSD or (2) weights defined to mimic prevalence of lifetime diagnosis of depression or PTSD.

A vocal acoustic data model was developed using features derived from audio diary recordings. Distribution of audio diaries per subject was between 1 and 2. Measures of audio features derived from audio files focuses on mean and standard deviation of DV1, sounds-depressedSD2 and mean EPDC. In addition, mean and mean of slice level standard deviation of the features Vocal-Effort and Pitch Variation were also considered. Specifically, audio diaries were processed with a configuration file to extract the next measures of features and the final running statistics of the audio file were selected to define the potential input variables in the model.

Figure 11:
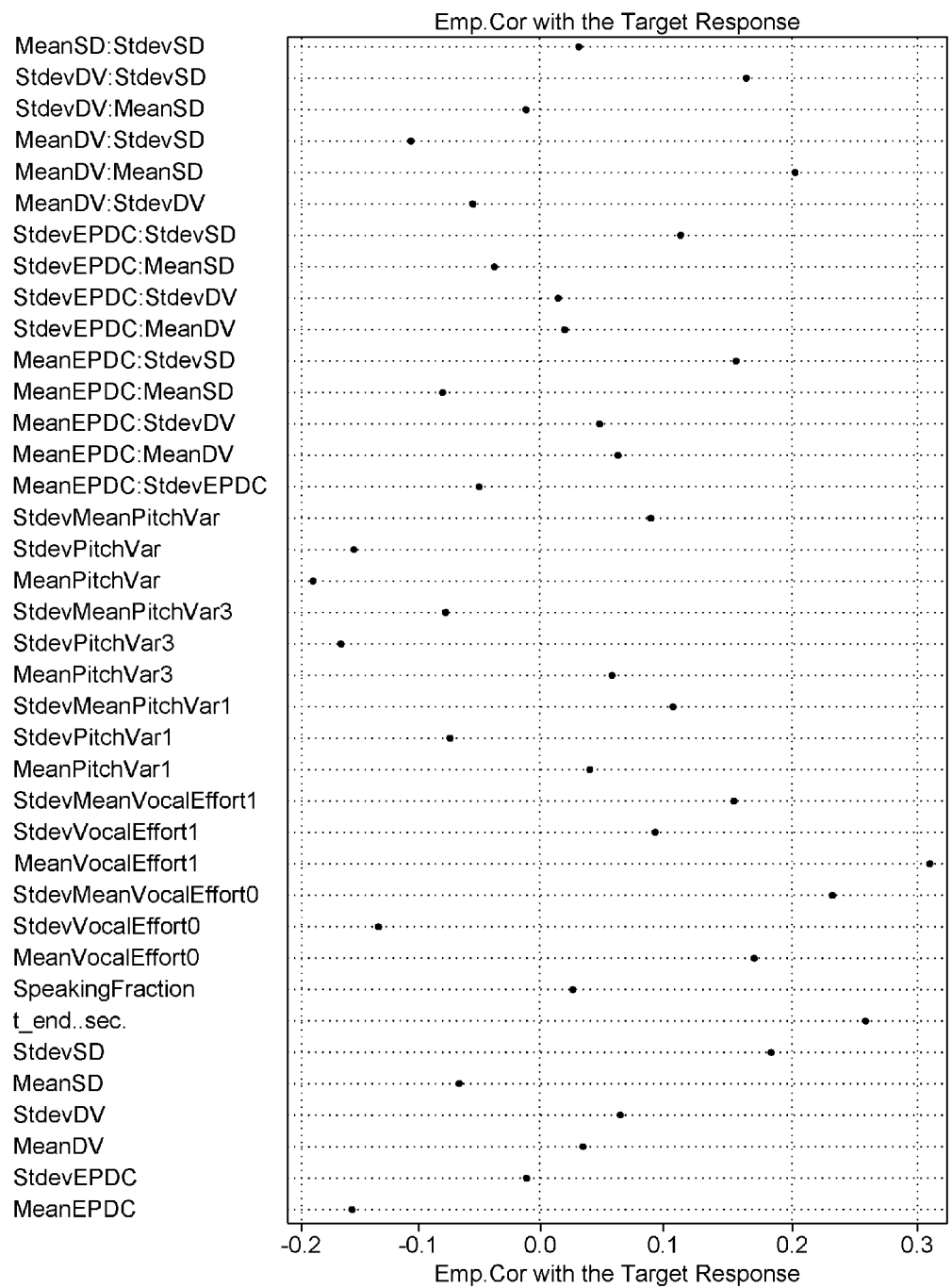
FIG. 11 illustrates an empirical correlation of candidate features with binary target response, in accordance with an exemplary embodiment.

Several plots were created to visualize the derived features and obtain insights about distributions, correlations, outstanding patters or possible outliers. There were observed several bias distribution variables. A binary target variable was defined based on SCID questions related to the A1-symptom: depressed mood most of the day. Response scores were between 0 and 3, with 0 representing inadequate information to assess symptom; 1 representing no symptom is present; 2 representing subclinical symptom present; and 3 representing clinical symptom present. FIG. 11 illustrates an empirical correlation of candidate features with binary target response, in accordance with an exemplary embodiment.

During the training stage, subject cases in the proposed models were weighted to compensate for the high observed prevalence of PTSD and depression history. Weights were defined such that the weighted sample prevalence in the sampled data would mimic the prevalence obtained from Collaborative Psychiatric Epidemiology Surveys. The measure of performance that was selected to compare candidate models was the cross validated AUC value. First, the elastic net procedure was applied to allow for variable selection.

A lasso approach which allows a more sparse variable selection solution identified the variables t_end - - - sec., MeanVocalEffort1 and MeanPitchVar as relevant for the target response. Four generalized linear models (glm) were selected and proposed to compare the performance with the elastic net model and with reduced set of variables models. The AUC values of these glm models were derived from several fold partitions to investigate the variability across different partitions.

Figure 12:
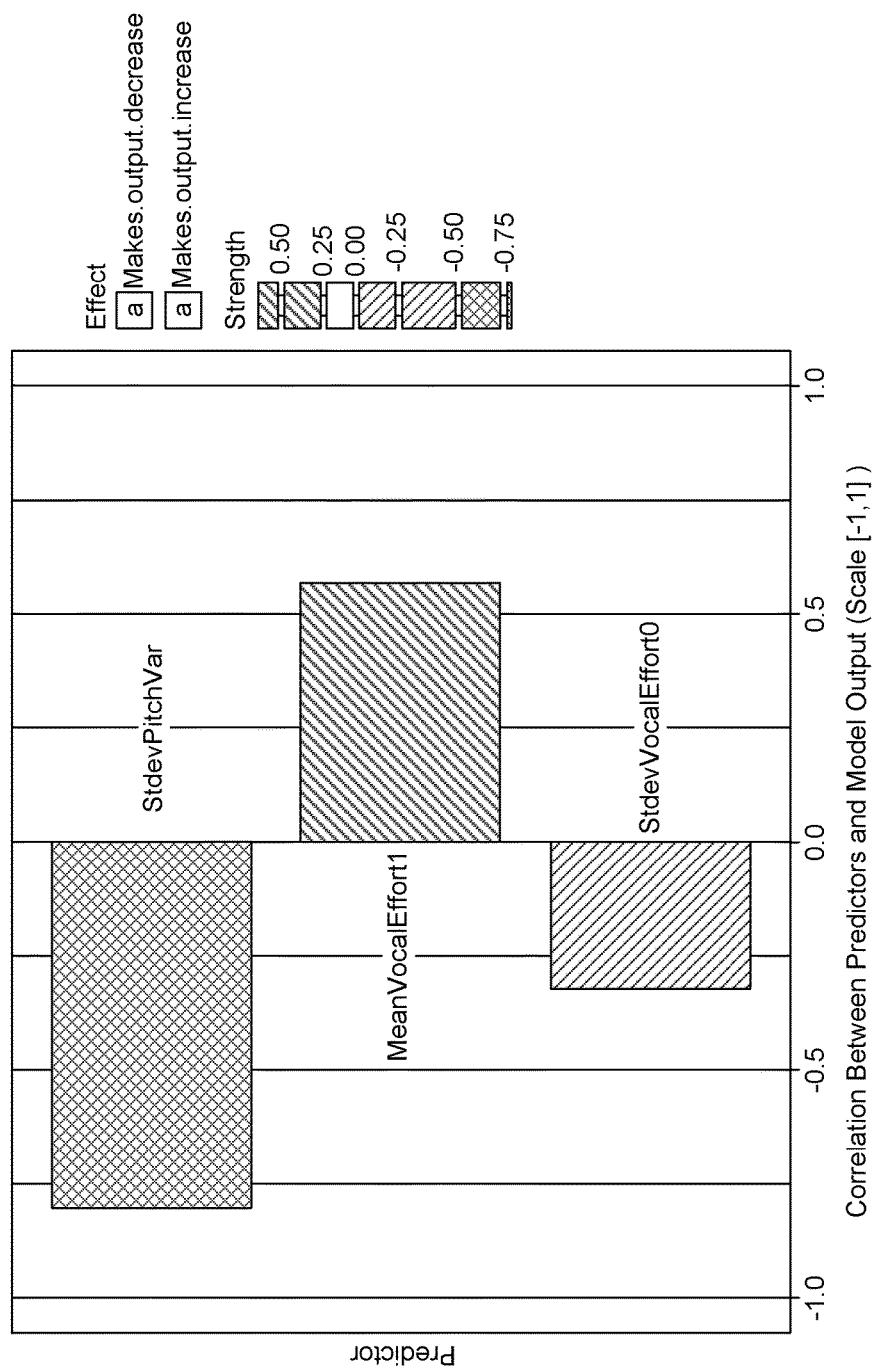
FIG. 12 illustrates a correlation of input model variables with model predictions before logistic transformation, in accordance with an exemplary embodiment.

The following two models were then selected:
1) StdevVocalEffort0+MeanVocalEffort1+StdevPitchVar
2) T.edn.sec.+StdevVocalEffort-+MeanVocalEffort1+StdevPitchVar The variables selected for the models are described above in more detail with reference to FIG. 6. Model 1 above was in turn fitted. FIG. 12 illustrates a correlation of input model variables with model predictions before logistic transformation, in accordance with an exemplary embodiment.

Figure 13:
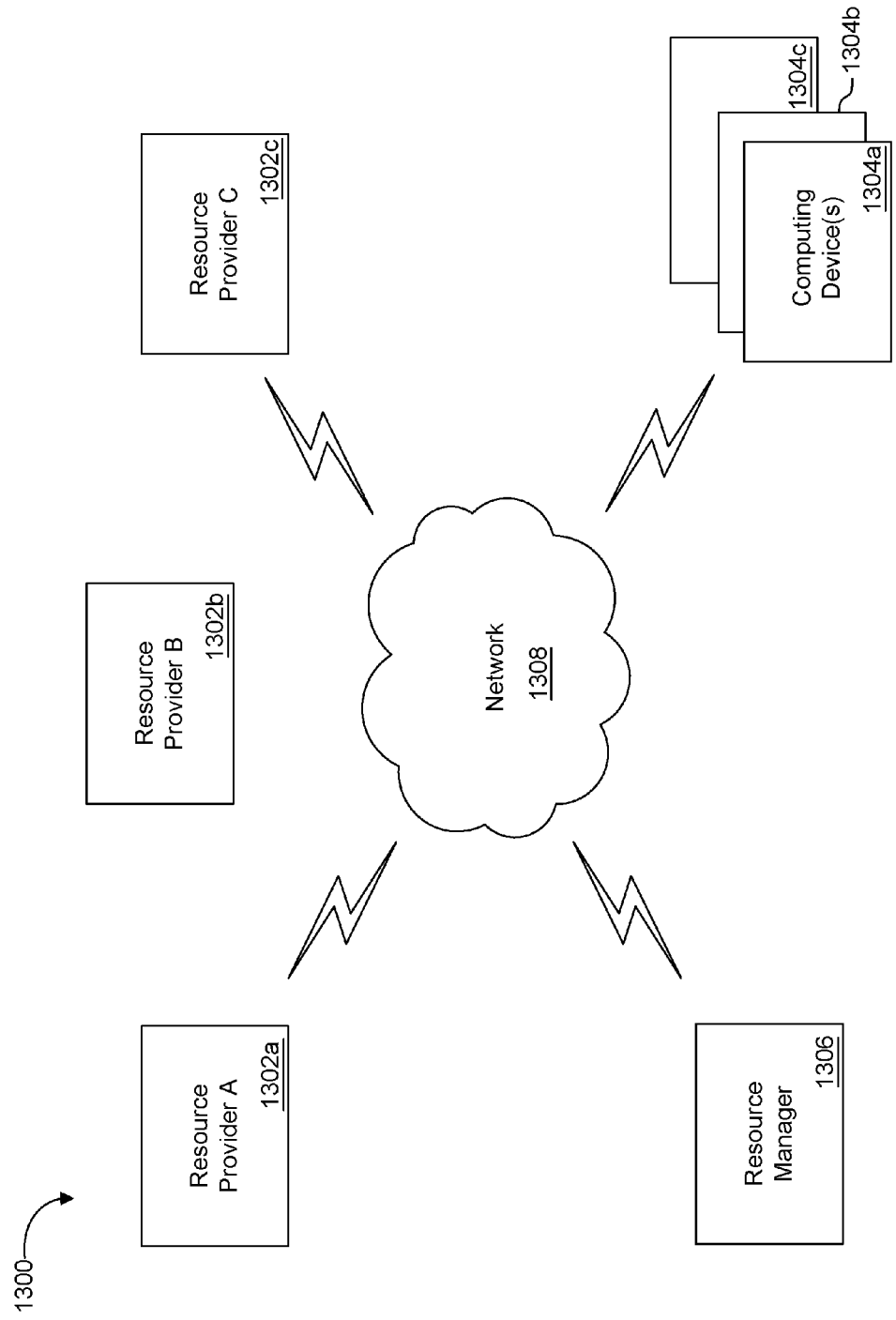
FIG. 13 is a block diagram of an example network environment for use in the methods and systems of the invention.

FIG. 13 shows an illustrative network environment 1300 for use in the methods and systems for use in the methods and systems described herein. In brief overview, referring now to FIG. 13, a block diagram of an exemplary cloud computing environment 1300 is shown and described. The cloud computing environment 1300 may include one or more resource providers 1302a, 1302b, 1302c (collectively, 1302). Each resource provider 1302 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 1302 may be connected to any other resource provider 1302 in the cloud computing environment 1300. In some implementations, the resource providers 1302 may be connected over a computer network 1308. Each resource provider 1302 may be connected to one or more computing device 1304a, 1304b, 1304c (collectively, 1304), over the computer network 1308.

The cloud computing environment 1300 may include a resource manager 1306. The resource manager 1306 may be connected to the resource providers 1302 and the computing devices 1304 over the computer network 1308. In some implementations, the resource manager 1306 may facilitate the provision of computing resources by one or more resource providers 1302 to one or more computing devices 1304. The resource manager 1306 may receive a request for a computing resource from a particular computing device 1304. The resource manager 1306 may identify one or more resource providers 1302 capable of providing the computing resource requested by the computing device 1304. The resource manager 1306 may select a resource provider 1302 to provide the computing resource. The resource manager 1306 may facilitate a connection between the resource provider 1302 and a particular computing device 1304. In some implementations, the resource manager 1306 may establish a connection between a particular resource provider 1302 and a particular computing device 1304. In some implementations, the resource manager 1306 may redirect a particular computing device 1304 to a particular resource provider 1302 with the requested computing resource.

Figure 14:
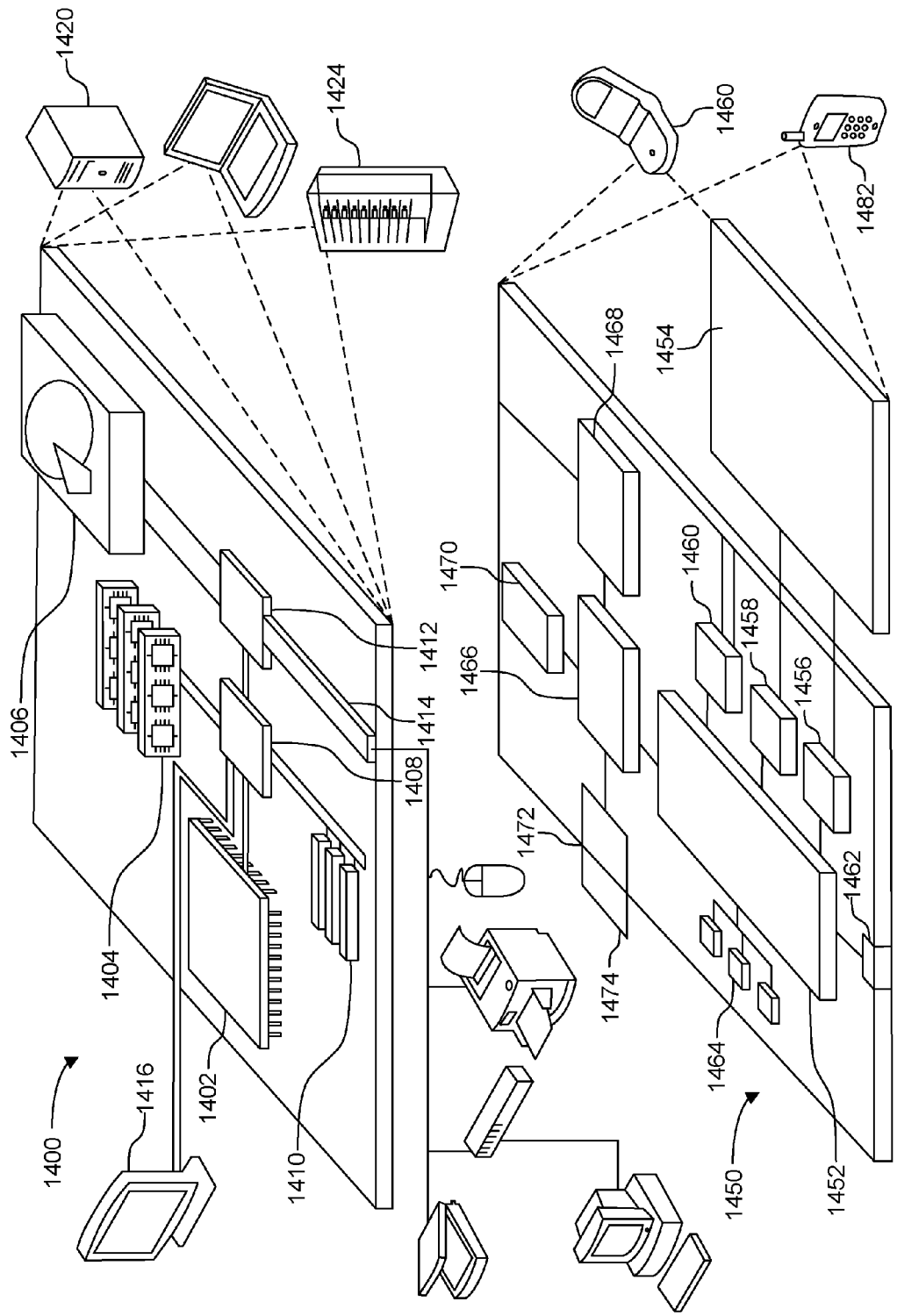
FIG. 14 is a block diagram of an example computing device and an example mobile computing device, for use in illustrative embodiments of the invention.

FIG. 14 shows an example of a computing device 1400 and a mobile computing device 1450 that can be used in the methods and systems described in this disclosure. The computing device 1400 is intended to represent various forms of digital computers, such as laptops, desktops, workstations, personal digital assistants, servers, blade servers, mainframes, and other appropriate computers. The mobile computing device 1450 is intended to represent various forms of mobile devices, such as personal digital assistants, cellular telephones, smartphones, and other similar computing devices. The components shown here, their connections and relationships, and their functions, are meant to be examples only, and are not meant to be limiting.

The computing device 1400 includes a processor 1402, a memory 1404, a storage device 1406, a high-speed interface 1408 connecting to the memory 1404 and multiple high-speed expansion ports 1410, and a low-speed interface 1412 connecting to a low-speed expansion port 1414 and the storage device 1406. Each of the processor 1402, the memory 1404, the storage device 1406, the high-speed interface 1408, the high-speed expansion ports 1410, and the low-speed interface 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as a display 1416 coupled to the high-speed interface 1408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1404 stores information within the computing device 1400. In some implementations, the memory 1404 is a volatile memory unit or units. In some implementations, the memory 1404 is a non-volatile memory unit or units. The memory 1404 may also be another form of computer-readable medium, such as a magnetic or optical disk.

The storage device 1406 is capable of providing mass storage for the computing device 1400. In some implementations, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1402), perform one or more methods, such as those described above. The instructions can also be stored by one or more storage devices such as computer- or machine-readable mediums (for example, the memory 1404, the storage device 1406, or memory on the processor 1402).

The high-speed interface 1408 manages bandwidth-intensive operations for the computing device 1400, while the low-speed interface 1412 manages lower bandwidth-intensive operations. Such allocation of functions is an example only. In some implementations, the high-speed interface 1408 is coupled to the memory 1404, the display 1416 (e.g., through a graphics processor or accelerator), and to the high-speed expansion ports 1410, which may accept various expansion cards (not shown). In the implementation, the low-speed interface 1412 is coupled to the storage device 1406 and the low-speed expansion port 1414. The low-speed expansion port 1414, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. In addition, it may be implemented in a personal computer such as a laptop computer 1422. It may also be implemented as part of a rack server system 1424. Alternatively, components from the computing device 1400 may be combined with other components in a mobile device (not shown), such as a mobile computing device 1450. Each of such devices may contain one or more of the computing device 1400 and the mobile computing device 1450, and an entire system may be made up of multiple computing devices communicating with each other.

The mobile computing device 1450 includes a processor 1452, a memory 1464, an input/output device such as a display 1454, a communication interface 1466, and a transceiver 1468, among other components. The mobile computing device 1450 may also be provided with a storage device, such as a micro-drive or other device, to provide additional storage. Each of the processor 1452, the memory 1464, the display 1454, the communication interface 1466, and the transceiver 1468, are interconnected using various buses, and several of the components may be mounted on a common motherboard or in other manners as appropriate.

The processor 1452 can execute instructions within the mobile computing device 1450, including instructions stored in the memory 1464. The processor 1452 may be implemented as a chipset of chips that include separate and multiple analog and digital processors. The processor 1452 may provide, for example, for coordination of the other components of the mobile computing device 1450, such as control of user interfaces, applications run by the mobile computing device 1450, and wireless communication by the mobile computing device 1450.

The processor 1452 may communicate with a user through a control interface 1458 and a display interface 1456 coupled to the display 1454. The display 1454 may be, for example, a TFT (Thin-Film-Transistor Liquid Crystal Display) display or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may provide communication with the processor 1452, so as to enable near area communication of the mobile computing device 1450 with other devices. The external interface 1462 may provide, for example, for wired communication in some implementations, or for wireless communication in other implementations, and multiple interfaces may also be used.

The memory 1464 stores information within the mobile computing device 1450. The memory 1464 can be implemented as one or more of a computer-readable medium or media, a volatile memory unit or units, or a non-volatile memory unit or units. An expansion memory 1474 may also be provided and connected to the mobile computing device 1450 through an expansion interface 1472, which may include, for example, a SIMM (Single In Line Memory Module) card interface. The expansion memory 1474 may provide extra storage space for the mobile computing device 1450, or may also store applications or other information for the mobile computing device 1450. Specifically, the expansion memory 1474 may include instructions to carry out or supplement the processes described above, and may include secure information also. Thus, for example, the expansion memory 1474 may be provided as a security module for the mobile computing device 1450, and may be programmed with instructions that permit secure use of the mobile computing device 1450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 1452), perform one or more methods, such as those described above. The instructions can also be stored by one or more storage devices, such as one or more computer- or machine-readable mediums (for example, the memory 1464, the expansion memory 1474, or memory on the processor 1452). In some implementations, the instructions can be received in a propagated signal, for example, over the transceiver 1468 or the external interface 1462.

The mobile computing device 1450 may communicate wirelessly through the communication interface 1466, which may include digital signal processing circuitry where necessary. The communication interface 1466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1068 using a radio-frequency. In addition, short-range communication may occur, such as using a Bluetooth®, Wi-Fi™, or other such transceiver (not shown). In addition, a GPS (Global Positioning System) receiver module 1470 may provide additional navigation- and location-related wireless data to the mobile computing device 1450, which may be used as appropriate by applications running on the mobile computing device 1450.

The mobile computing device 1450 may also communicate audibly using an audio codec 1460, which may receive spoken information from a user and convert it to usable digital information. The audio codec 1460 may likewise generate audible sound for a user, such as through a speaker, e.g., in a handset of the mobile computing device 1450. Such sound may include sound from voice telephone calls, may include recorded sound (e.g., voice messages, music files, etc.) and may also include sound generated by applications operating on the mobile computing device 1450.

The mobile computing device 1450 may be implemented in a number of different forms, as shown in the figure. For example, it may be implemented as a cellular telephone 1480. It may also be implemented as part of a smart-phone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method for identifying human mental health states using mobile device data, the method comprising:
   training a statistical behavioral data model using measurements of raw features collected from a plurality of mobile devices, the raw features including one or more of:
   (i) call features including, for each of a plurality of calls, one or more of: time, telephone number, outcall indicator, incall indicator, missed call indicator, and duration;
   (ii) short message service (SMS) features including, for each of a plurality of SMS messages, one or more of: time, phone address, outgoing SMS indicator, and incoming SMS indicator; and
   (iii) travel features including, for each of a plurality of measured positions, at least one of: time when the position was measured, location of the position, and location accuracy of the position;
   receiving, by a processor, mobile device data, the mobile device data being associated with a mobile device corresponding to a user, and the mobile device data comprising one or more of:
   (1) sensor data, the sensor data being obtained from sensors of the mobile device corresponding to the user, wherein the sensors include one or more of an accelerometer, a gyroscope, and a global positioning system (GPS), and
   (2) usage data, the usage date including one or more of a call log, a short message service (SMS) log, screen state, voice data and battery life;
   storing the mobile device data in a memory associated with the mobile device;
   deriving, by the processor, measurements from the mobile device data, wherein deriving measurements from the mobile device data comprises at least one of:
   (i) calculating, by the processor, a call out metric, indicating the number of calls originated from the mobile device of the user during a given time;
   (ii) calculating, by the processor, a travel distance metric, indicating the total distance traveled by the user while in possession of the mobile device during the given time; and
   (iii) calculating, by the processor, an SMS address metric, indicating the number of addresses to which SMS messages were sent during the given time;
   operating, by the processor, software to execute the statistical behavioral data model comprising one or more statistical models to calculate, from the derived measurements, one or more area-under-the-curve (AUC) values;
   calculating, by the processor, from the area-under-the-curve (AUC) values, one or more predictive model outputs, the one or more predictive model outputs comprising probability values of one or more symptoms, the probability values indicating the likelihood of the one or more symptoms being present in the user based on the derived measurements from the mobile device data associated with the mobile device; and
   determining, by the processor, based on the probability values of the one or more symptoms, one or more disorders suffered by the user.

2. The method of claim 1,
   wherein the mobile device data includes behavioral data, the behavioral data comprising the sensor data and the usage data.

3. The method of claim 1, wherein the measurements of the raw features include one or more of:
   (i) periodic call features associated with one of the plurality of mobile devices, the periodic call features including one or more of: call number count, outcall count, incall count, missed call count, call duration count, outcall mean, incall mean, missed call mean, and call duration mean;
   (ii) periodic SMS features associated with one of the plurality of mobile devices, the periodic SMS features including one or more of: SMS address count, outgoing SMS count, incoming SMS count, elapsed SMS count, incoming SMS mean, outgoing SMS mean, and elapsed SMS mean; and
   (iii) periodic travel features associated with one of the plurality of mobile devices, the periodic travel features including one or more of: travel distance sum, travel elapsed sum, and travel variance sum.

4. The method of claim 1, wherein the mobile device data is passively collected from the mobile device.

5. The method of claim 1,
   wherein the processor is embedded in the mobile device of the user, and
   wherein the predictive model is stored in the memory associated with the mobile device of the user.

6. The method of claim 1, wherein the predictive model further comprises a vocal acoustic data model for identifying human mental health states based on measurements of features extracted from audio data.

7. The method according to claim 1, wherein the method comprises:
   generating, by the processor, based on a change in the probability values of a subset of one or more of the symptoms, an overview metric.

8. The method according to claim 7, wherein generating the overview metric comprises: comparing, by the processor, the probability values of the subset of the one or more symptoms with a previously stored set of probability values for the one or more symptoms;
   determining, by the processor, a change in the probability values for each symptom of the subset of the one or more symptoms;
   calculating, by the processor, an average change in the probability values for each symptom of the subset of the one or more symptoms; and
   generating, by the processor, the overview metric, the overview metric comprising an average of the average change in the probability values for each symptom of the subset of the one or more symptoms.

9. The method according to claim 7, wherein generating the overview metric comprises:
   computing, by the processor, for each symptom of the subset of the one or more symptoms, a set of absolute differences in value between each adjacent index in a set of probability vectors, a first probability vector comprising a first probability value for a first symptom of the subset of the one or more symptoms, and probability values for each entry for the first symptom in the previously stored set of probability values;
   summing, by the processor, each of the sets of absolute differences, thereby generating a set of sums of absolute differences;
   dividing, by the processor, each of the set of sums of absolute differences by a total number of pairwise comparisons made for each of the symptoms of the subset of the one or more symptoms, thereby generating a set of probability value averages; and calculating, by the processor, an average of the set of probability value averages, thereby generating the overview metric.

10. A system for identifying human mental health states using mobile device data, comprising: a memory operable to store a predictive model; and
a processor communicatively coupled to the memory, the processor being operable to:
receive mobile device data, the mobile device data being associated with a mobile device corresponding to a user, and the mobile device data comprising one or more of:
(1) sensor data, the sensor data being obtained from sensors of the mobile device corresponding to the user, wherein the sensors include one or more of an accelerometer, a gyroscope, and a global positioning system (GPS), and
(2) usage data, the usage date including one or more of a call log, a short message service (SMS) log, screen state, voice data and battery life; store the mobile device data in the memory;
derive measurements from the mobile device data, wherein deriving measurements from the mobile device data comprises at least one of:
(i) calculating, by the processor, a call out metric, indicating the number of calls originated from the mobile device of the user during a given time;
(ii) calculating, by the processor, a travel distance metric, indicating the total distance traveled by the user while in possession of the mobile device during the given time; and
(iii) calculating, by the processor, a SMS address metric, indicating the number of addresses to which SMS messages were sent during the given time;
operate software to execute a statistical behavioral data model comprising one or more statistical models to calculate, from the derived measurements, one or more area-under-the-curve (AUC) values, wherein the statistical behavioral data model is trained using measurements of raw features collected from a plurality of mobile devices, the raw features including one or more of:
(i) call features including, for each of a plurality of calls, one or more of: time, telephone number, outcall indicator, incall indicator, missed call indicator, and duration;
(ii) short message service (SMS) features including, for each of a plurality of SMS messages, one or more of: time, phone address, outgoing SMS indicator, and incoming SMS indicator; and
(iii) travel features including, for each of a plurality of measured positions, at least one of: time when the position was measured, location of the position, and location accuracy of the position;
calculate, from the area-under-the-curve (AUC) values, one or more predictive model outputs comprising probability values of one or more symptoms, the probability values indicating the likelihood of the one or more symptoms being present in the user based on the derived measurements from the mobile device data associated with the mobile device; and
determine, based on the probability values of the one or more symptoms, one or more disorders suffered by the user.

* * * * *